US009706595B2

(12) United States Patent
Nishina

(10) Patent No.: US 9,706,595 B2
(45) Date of Patent: Jul. 11, 2017

(54) CALL PROCESSING CONTROL DEVICE, MOBILE COMMUNICATION SYSTEM, METHOD FOR RESTRICTING RECEPTION OF CALL CONNECTION REQUEST, AND READABLE MEDIUM

(71) Applicant: NEC CORPORATION, Tokyo (JP)

(72) Inventor: Hirotaka Nishina, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/913,003

(22) PCT Filed: Jul. 2, 2014

(86) PCT No.: PCT/JP2014/003523
§ 371 (c)(1),
(2) Date: Feb. 19, 2016

(87) PCT Pub. No.: WO2015/025452
PCT Pub. Date: Feb. 26, 2015

(65) Prior Publication Data
US 2016/0205718 A1 Jul. 14, 2016

(30) Foreign Application Priority Data

Aug. 23, 2013 (JP) ................................. 2013-173225

(51) Int. Cl.
*H04W 76/02* (2009.01)

(52) U.S. Cl.
CPC ....... *H04W 76/027* (2013.01); *H04W 76/021* (2013.01)

(58) Field of Classification Search
CPC .......................... H04W 76/027; H04W 76/021
(Continued)

(56) References Cited

U.S. PATENT DOCUMENTS 6,374,099 B1\* 4/2002 Bi .......................... H04W 48/06
370/329
8,588,792 B2\* 11/2013 Lee ................... H04W 74/0833
370/229
(Continued)

FOREIGN PATENT DOCUMENTS

EP 2739023 A1 6/2014
JP 2003-37619 A 2/2003
(Continued)

OTHER PUBLICATIONS

International Search Report of PCT/JP2014/003523, dated Sep. 16, 2014. [PCT/ISA/210].
(Continued)

*Primary Examiner* — Cong Tran
(74) *Attorney, Agent, or Firm* — Sughrue Mion, PLLC

(57) ABSTRACT

A call processing control device (20), upon receiving a call connection request (32) from a mobile terminal (30), performs connection setup processing. The call processing control device (20) is equipped with: a call type determination unit (21) that determines the call type of the call connection request (32) and classifies, based on the determination result, the call connection request (32) as a request that is to be subjected to acceptance determination or as a request that is not; and an acceptance determination unit (22) that determines whether to or not to accept the call connection request (32) that has been classified as a request to be subjected to the acceptance determination. Thereby, congestion can be suppressed while suppressing influence on high-priority call connection requests.

8 Claims, 23 Drawing Sheets

(58) Field of Classification Search
USPC ......... 455/428, 435.1–3, 445, 556.1, 556.24, 455/556.2, 455, 412.1–28, 45; 705/14.4, 705/14.41
See application file for complete search history.

(56) References Cited

U.S. PATENT DOCUMENTS

| | | | | |
|---|---|---|---|---|
| 8,750,842 | B1* | 6/2014 | Prasad | H04M 3/436 |
| | | | | 455/414.1 |
| 8,787,953 | B1* | 7/2014 | Koster | H04M 3/5231 |
| | | | | 455/466 |
| 9,451,621 | B2* | 9/2016 | Nishina | H04W 72/0493 |
| 2006/0019702 | A1* | 1/2006 | Anttila | H04M 1/72547 |
| | | | | 455/556.1 |
| 2008/0076442 | A1 | 3/2008 | Ishii et al. | |
| 2012/0143670 | A1* | 6/2012 | Edwards | G06Q 30/02 |
| | | | | 705/14.35 |
| 2012/0163168 | A1 | 6/2012 | Choi | |
| 2012/0172065 | A1* | 7/2012 | Gosselin | H04M 1/575 |
| | | | | 455/458 |
| 2012/0263036 | A1 | 10/2012 | Barclay et al. | |
| 2012/0290404 | A1* | 11/2012 | Chuang | H04L 51/14 |
| | | | | 705/14.69 |
| 2013/0051332 | A1 | 2/2013 | Sridhar | |
| 2013/0303182 | A1* | 11/2013 | Chung | H04W 48/06 |
| | | | | 455/453 |
| 2014/0379467 | A1* | 12/2014 | Huang | G06Q 30/0281 |
| | | | | 705/14.53 |

FOREIGN PATENT DOCUMENTS

| | | |
|---|---|---|
| JP | 2003-283656 A | 10/2003 |
| JP | 2008-104168 A | 5/2008 |
| JP | 2012-134583 A | 7/2012 |
| JP | 2013-38573 A | 2/2013 |
| WO | 2013/014842 A1 | 1/2013 |

OTHER PUBLICATIONS

Written Opinion of PCT/JP2014/003523, dated Sep. 16, 2014. [PCT/ISA/237].
Communication dated Mar. 22, 2017, from the European Patent Office in counterpart European Application No. 14837350.9.

* cited by examiner

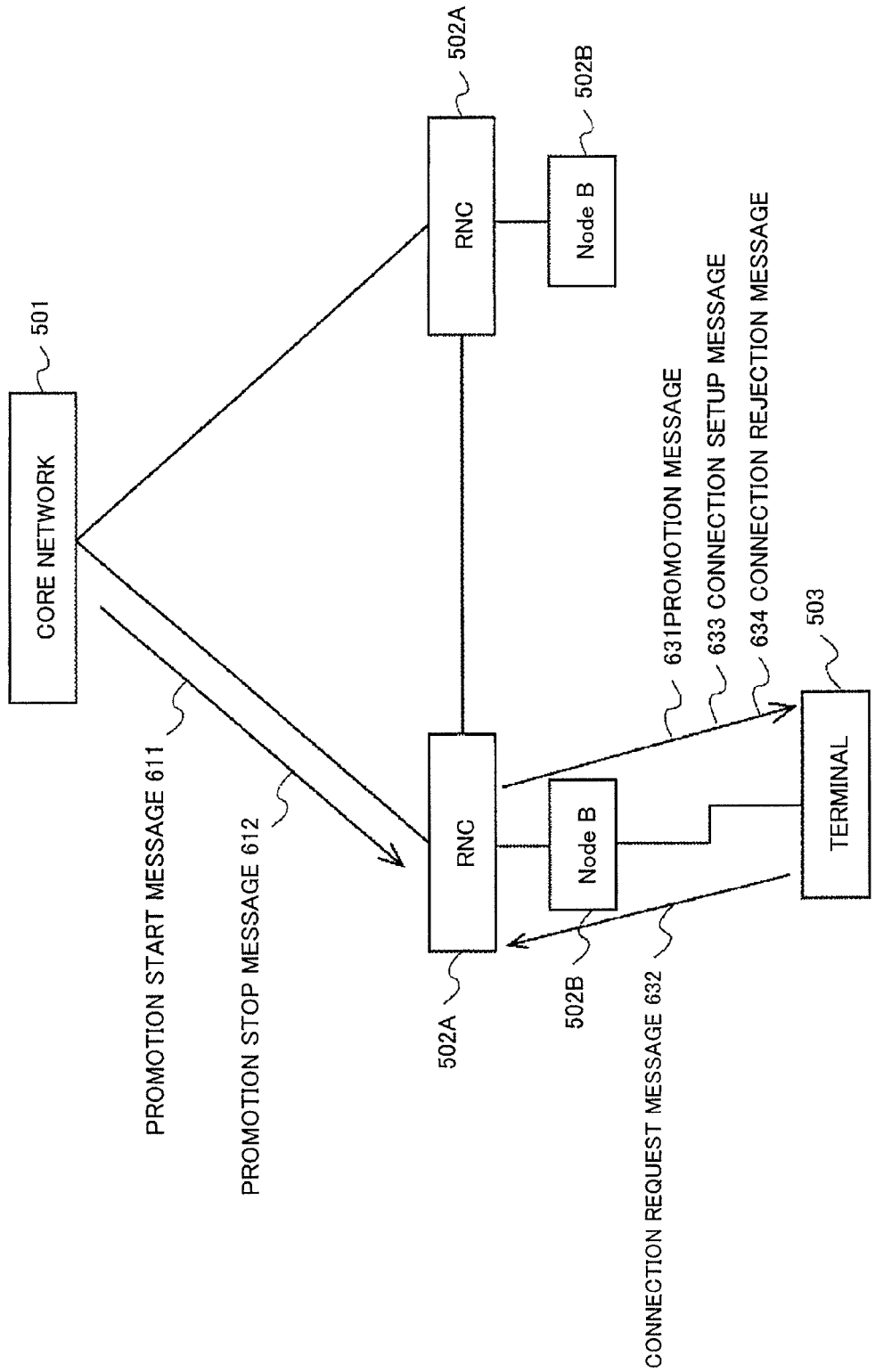

CALL PROCESSING CONTROL DEVICE, MOBILE COMMUNICATION SYSTEM, METHOD FOR RESTRICTING RECEPTION OF CALL CONNECTION REQUEST, AND READABLE MEDIUM

CROSS REFERENCE TO RELATED APPLICATIONS

This application is a National Stage of International Application No. PCT/JP2014/003523 filed Jul. 2, 2014, claiming priority based on Japanese Patent Application No. 2013-173225, filed Aug. 23, 2013, the contents of all of which are incorporated herein by reference in their entirety.

TECHNICAL FIELD

The present invention relates to a call processing control device, a mobile communication system, a method for restricting reception of call connection request, and a program (readable medium).

BACKGROUND ART

Patent Literature (PTL) 1 discloses a mobile communication system that is capable of achieving an improvement in a utilization rate by doing a promotion that presents a favorable term in terms of price or the like to users when the utilization rate of the network of the mobile communication system is low. In the mobile communication system, by receiving utilization promotion information from a core network, a radio base station informs of the utilization promotion information to terminals under the radio base station.

On the other hand, Patent Literature 2 discloses a mobile packet communication system that makes it possible to restrict an increase in transmission delay and prevent a quality deterioration while improving the utilization efficiency of a radio channel. The packet communication system includes a storage means that stores information on currently set packet calls, a new call judging means that, in receiving a setup request of a packet call transmitted by a mobile station, judges whether or not the packet call is a new call on the basis of the information stored in the storage means, and an acceptance determination means that determines whether or not to accept the setup request of a packet call that is judged as a new call.

CITATION LIST

Patent Literature

PTL 1: WO 2013/014842
PTL 2: Japanese Unexamined Patent Application Publication No. 2003-037619

SUMMARY OF INVENTION

Technical Problem

In the case of the mobile communication system disclosed in PTL 1, there is a possibility that a plurality of terminals that have received utilization promotion information make a lot of call connection requests simultaneously, causing instantaneous congestion on radio base stations and the core network. Since carrying out congestion prevention for the above case by using a method for restricting reception of setup requests as disclosed in PTL 2 causes the reception of new calls to be restricted regardless of call types of call connection requests, a situation may take place in which both a high-priority call connection request, such as an emergency call, and a call connection request the priority of which is supposed to be low, such as a call connection request transmitted with utilization promotion information as a trigger, are denied acceptance in the same way.

The present invention is made in consideration of the above-described problem, and has an object to provide a call processing control device, a mobile communication system, a method for restricting reception of call connection requests, and a program that are capable of suppressing congestion while suppressing influence on high-priority call connection requests.

Solution to Problem

A call processing control device of the present invention accepts a call connection request(s) from a mobile terminal(s) and performs connection setup processing. The call processing control device comprises a call type determination means for determining a call type(s) of a call connection request(s) and, based on a determination result(s), classifying the call connection request(s) as either a subject(s) for acceptance determination or not a subject(s) for acceptance determination, and an acceptance determination means for determining whether or not to accept a call connection request(s) that is/are classified as a subject(s) for acceptance determination.

A mobile communication system of the present invention comprises
a call processing control device that receives a call connection request(s) from a mobile terminal(s) and performs connection setup processing. The call processing control device comprises a call type determination means for determining a call type(s) of the call connection request(s) and, based on a determination result(s), classifying the call connection request(s) as either a subject(s) for acceptance determination or not a subject(s) for acceptance determination, and an acceptance determination means for determining whether or not to accept a call connection request(s) that is/are classified as a subject(s) for acceptance determination.

A method for restricting reception of a call connection request(s) of the present invention comprises steps of determining a call type(s) of a call connection request(s) from a mobile terminal(s), based on a result(s) of determining a call type(s), classifying the call connection request(s) as either a subject(s) for acceptance determination or not a subject(s) for acceptance determination, and determining whether or not to accept a call connection request(s) that is/are classified as a subject(s) for acceptance determination.

A program of the present invention causes a computer execute the above-described method for restricting reception of a call connection request(s).

Advantageous Effects of Invention

With the present invention, it is possible to provide a call processing control device, a mobile communication system, a method for restricting reception of call connection requests, and a program that are capable of suppressing congestion while suppressing influence on high-priority call connection requests.

BRIEF DESCRIPTION OF DRAWINGS

FIG. 23 is a diagram illustrating a configuration of a mobile communication system according to a fourth exemplary embodiment.

DESCRIPTION OF EMBODIMENTS

Hereinafter, a call processing control device, a mobile communication system, a method for restricting reception of call connection requests, and a program according to exemplary embodiments of the present invention will be described with reference to the accompanying drawings.

First Exemplary Embodiment

Figure 1:
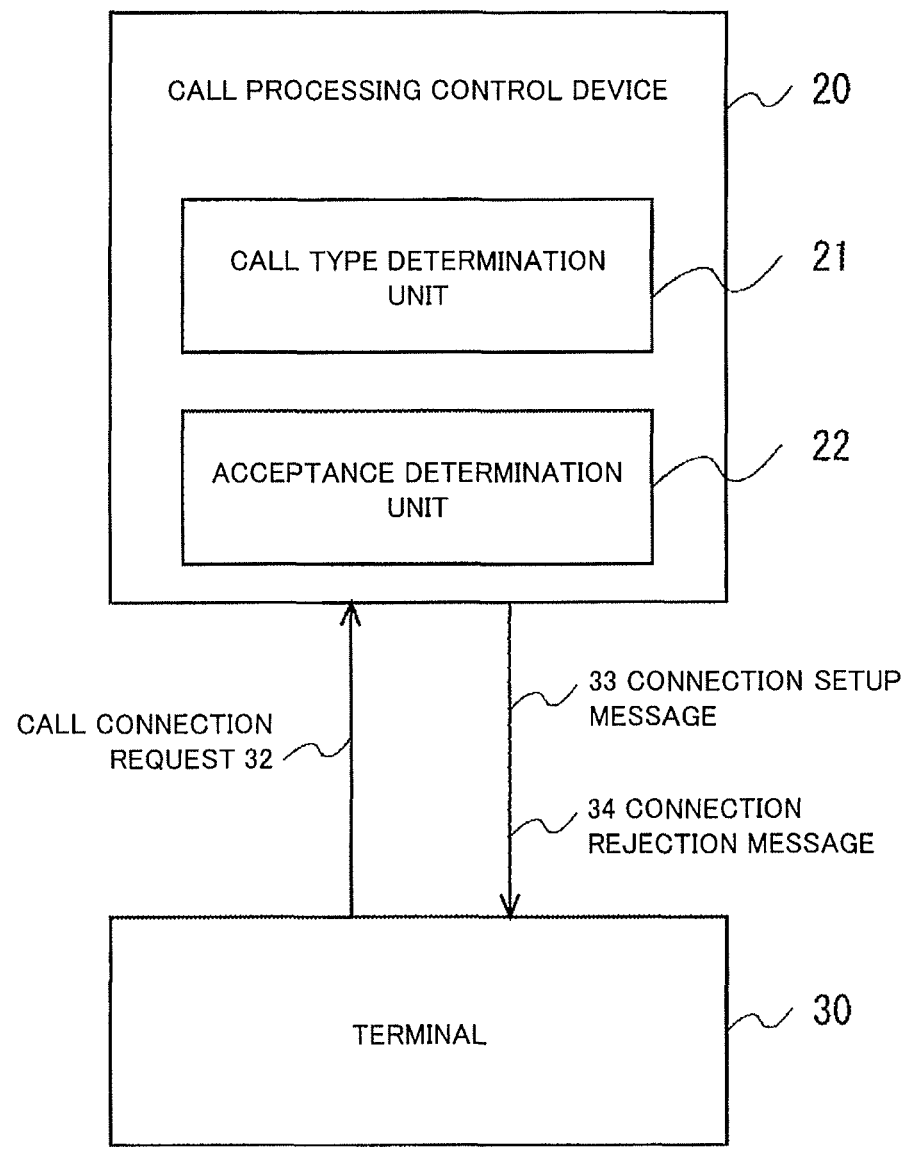
FIG. 1 is a diagram illustrating a configuration of a mobile communication system according to a first exemplary embodiment.

With reference to FIG. 1, a configuration of a mobile communication system according to a first exemplary embodiment will be described. The mobile communication system is, for example, a mobile telephone network. The mobile communication system includes a call processing control device 20 and a plurality of terminals 30. The terminals 30 are portable. The call processing control device 20 includes a call type determination unit 21 and an acceptance determination unit 22. Each terminal 30 transmits a call connection request 32 to the call processing control device 20. The call processing control device 20 transmits a connection setup message 33 or a connection rejection message 34 to each terminal 30.

Figure 2:
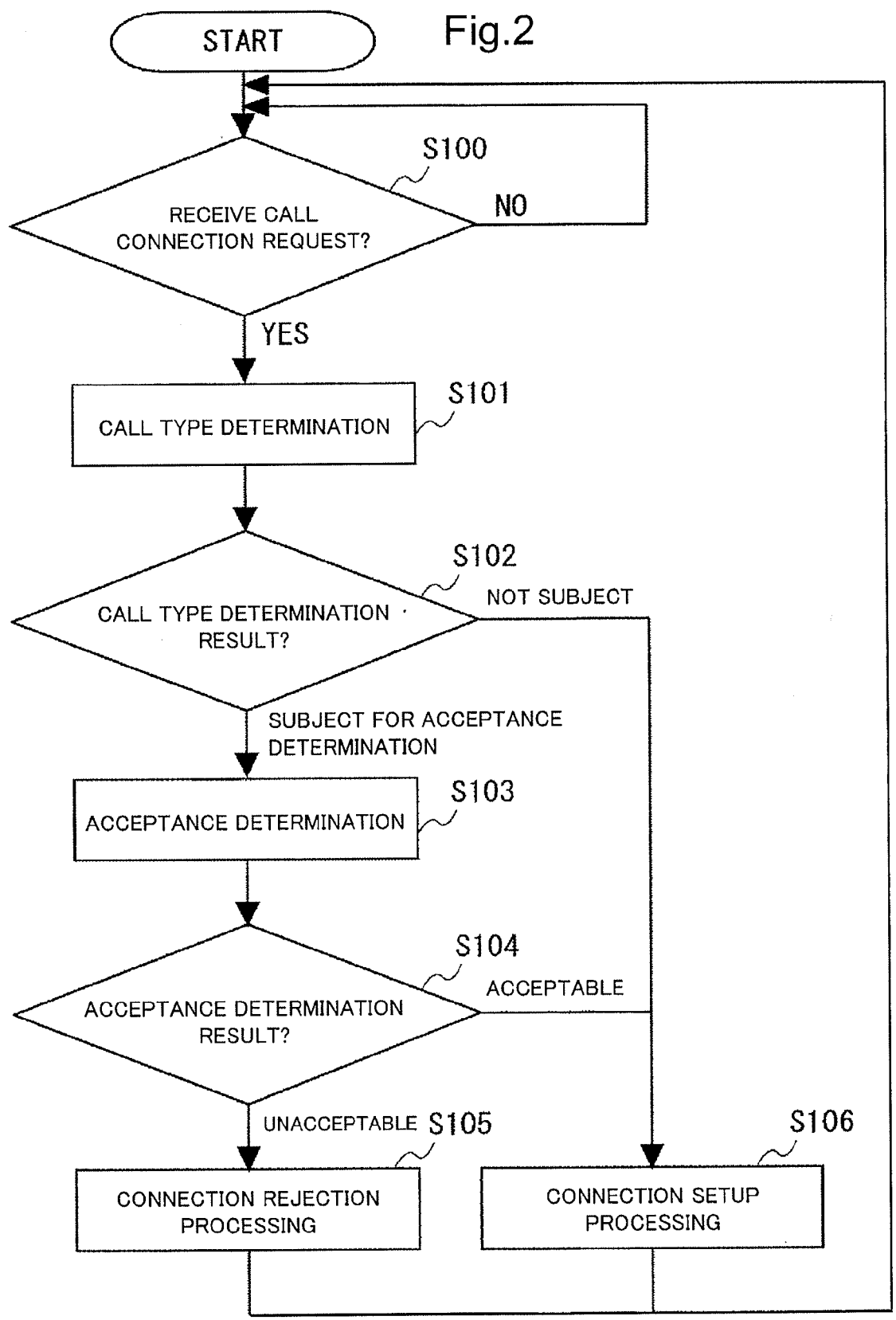
FIG. 2 is a flowchart illustrating a method for restricting reception of a call connection request(s) according to the first exemplary embodiment.

With reference to FIG. 2, a method for restricting reception of a call connection request(s) according to the first exemplary embodiment will be described. When the call processing control device 20 receives a call connection request 32 from a terminal 30 (step S100), the call type determination unit 21 determines a call type of the call connection request 32 (step S101) and classifies, based on the result of the determination, the call connection request 32 as either a subject for acceptance determination or not a subject for acceptance determination (step S102). In the case of a subject for acceptance determination, the process proceeds to step S103. In the case of not a subject for acceptance determination, the process proceeds to step S106.

The acceptance determination unit 22 determines whether or not to accept the call connection request 32 that has been classified as a subject for acceptance determination (step S103). In the case of determining to accept the call connection request 32 (acceptable in step S104), the process proceeds to step S106. In the case of determining not to accept the call connection request 32 (unacceptable in step S104), the process proceeds to step S105. In step S105, the call processing control device 20 performs connection rejection processing for the call connection request 32. In the connection rejection processing, the call processing control device 20 transmits a connection rejection message 34 to the terminal 30. After step S105, the process returns to step S100. In step S106, the call processing control device 20 performs connection setup processing for the call connection request 32. In the connection setup processing, the call processing control device 20 transmits a connection setup message 33 to the terminal 30. After step S106, the process returns to step S100.

According to the exemplary embodiment, the call type(s) of a call connection request(s) 32 is/are determined, and, based on the result(s) of the determination of the call type(s), the call connection request(s) 32 is/are classified as a subject(s) for acceptance determination or not a subject(s) for acceptance determination. Accordingly, it is possible that, for a call connection request(s) 32 that is/are determined to have a high-priority call type, connection setup processing is performed, and, for a call connection request(s) 32 that is/are determined to have a low-priority call type, whether to perform connection setup processing or connection rejection processing is determined through acceptance determination. In consequence, it is possible to suppress congestion in a mobile communication system while suppressing influence on a high-priority call connection requests(s) 32.

Second Exemplary Embodiment

Next, a mobile communication system according to a second exemplary embodiment will be described. The mobile communication system according to the second exemplary embodiment is a mobile communication system based on LTE (Long Term Evolution). The mobile communication system according to the second exemplary embodiment attempts to raise the utilization rate by carrying out promotion in which a favorable term in terms of price is presented to users when the utilization rate of the network is low.

Figure 3:
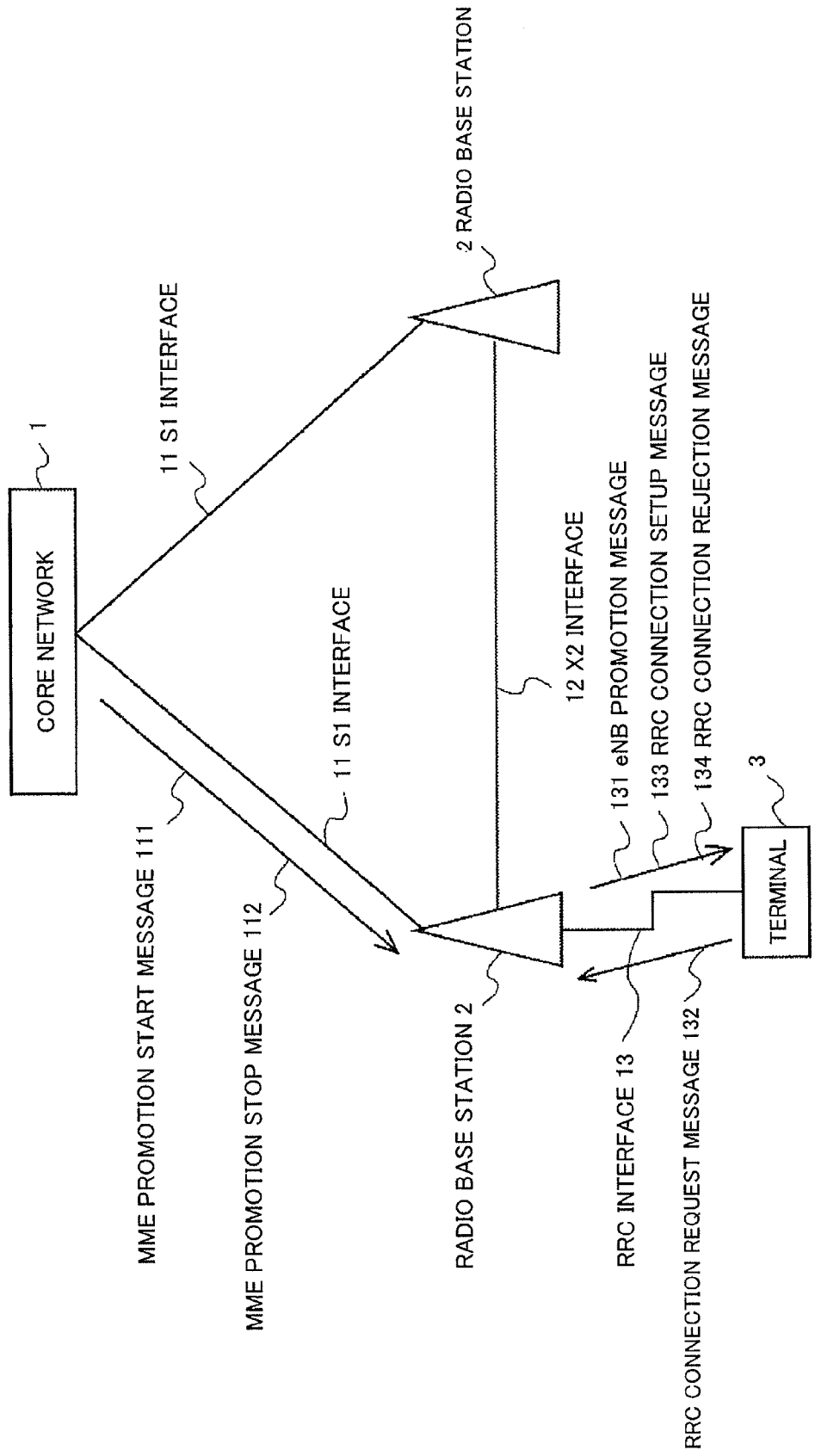
FIG. 3 is a diagram illustrating a configuration of a mobile communication system according to a second exemplary embodiment.

With reference to FIG. 3, a configuration of the mobile communication system according to the second exemplary embodiment will be described. The mobile communication system according to the second exemplary embodiment includes a plurality of terminals 3, each of which is a portable radio device that users use and is referred to as a UE (User Equipment) in LTE, radio base stations 2, each of which performs radio communication with terminals 3 and is referred to as an eNB (Enhanced NodeB) in LTE, and a core network 1, which is a higher-level network of the terminals and the radio base stations and is referred to as an MME (Mobility Management Entity) and an SGW (Serving Gateway). Also, interfaces between these nodes include an RRC (Radio Resource Control) interface 13 based on a radio connection, an X2 interface 12 between radio base stations 2, and an S1 interface 11 between a radio base station 2 and the core network 1.

Figure 4:
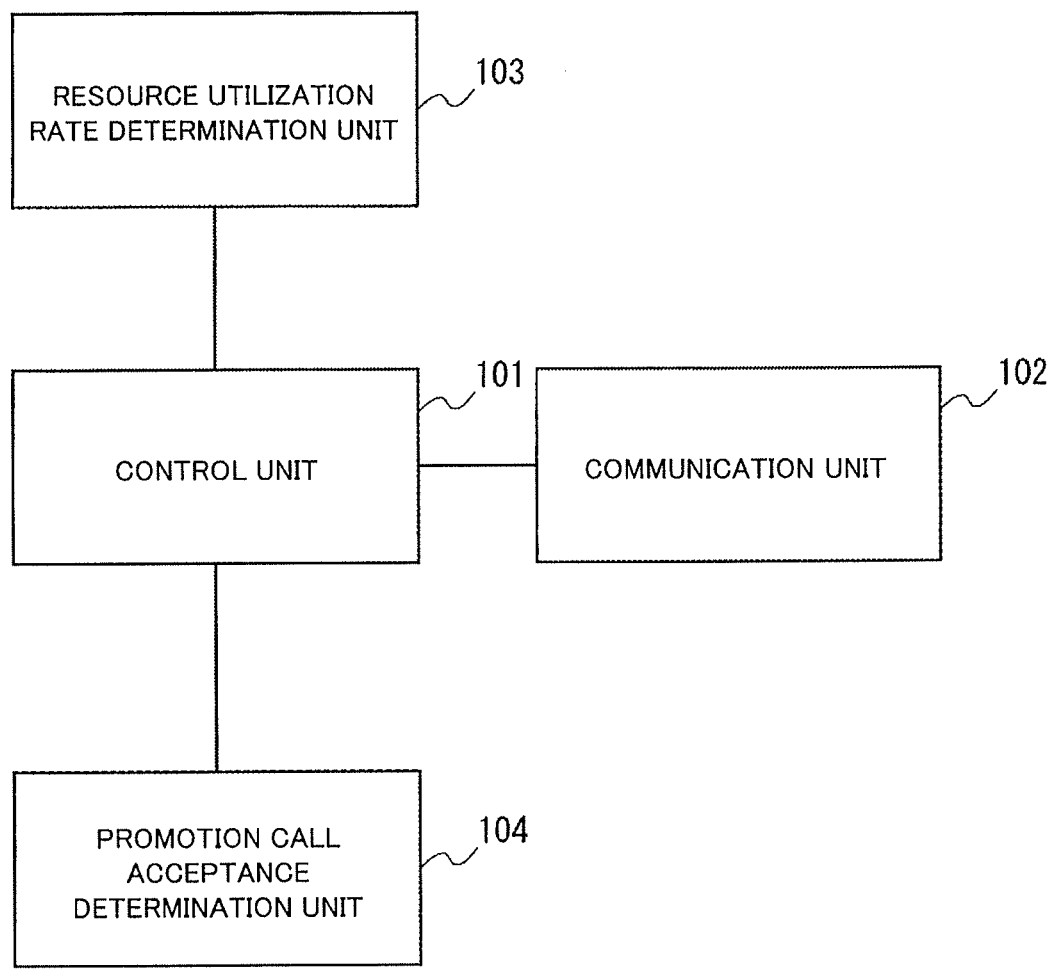
FIG. 4 is a diagram illustrating a configuration of a core network in FIG. 3.

The core network 1 is configured with an MME, which performs network control, and an SGW, which deals with user data, and performs service control, charging control, and connection to the Internet and telephone networks. The core network 1 is also referred to as a core network device sometimes. FIG. 4 is a diagram illustrating a configuration of the core network 1 in FIG. 3. A resource utilization rate determination unit 103 of the core network 1 measures the number of users who are connected to the MME or SGW itself or the amount of user data in processing and compares a resource utilization rate, which is obtained by comparing the measured value with an allowable value of the core network 1 itself, with a predetermined value. When the resource utilization rate is lower than the predetermined value, a control unit 101 of the core network 1 determines that the core network 1 is in a state in which utilization is promotable.

In this case, the control unit 101 transmits MME promotion start messages 111 to the radio base stations 2 that are connected through the S1 interfaces 11, using a communication unit 102. The MME promotion start message 111 is information that informs the radio base stations 2 under the core network 1 of the start of utilization promotion in which terminals are encouraged to perform communication.

Figure 5:
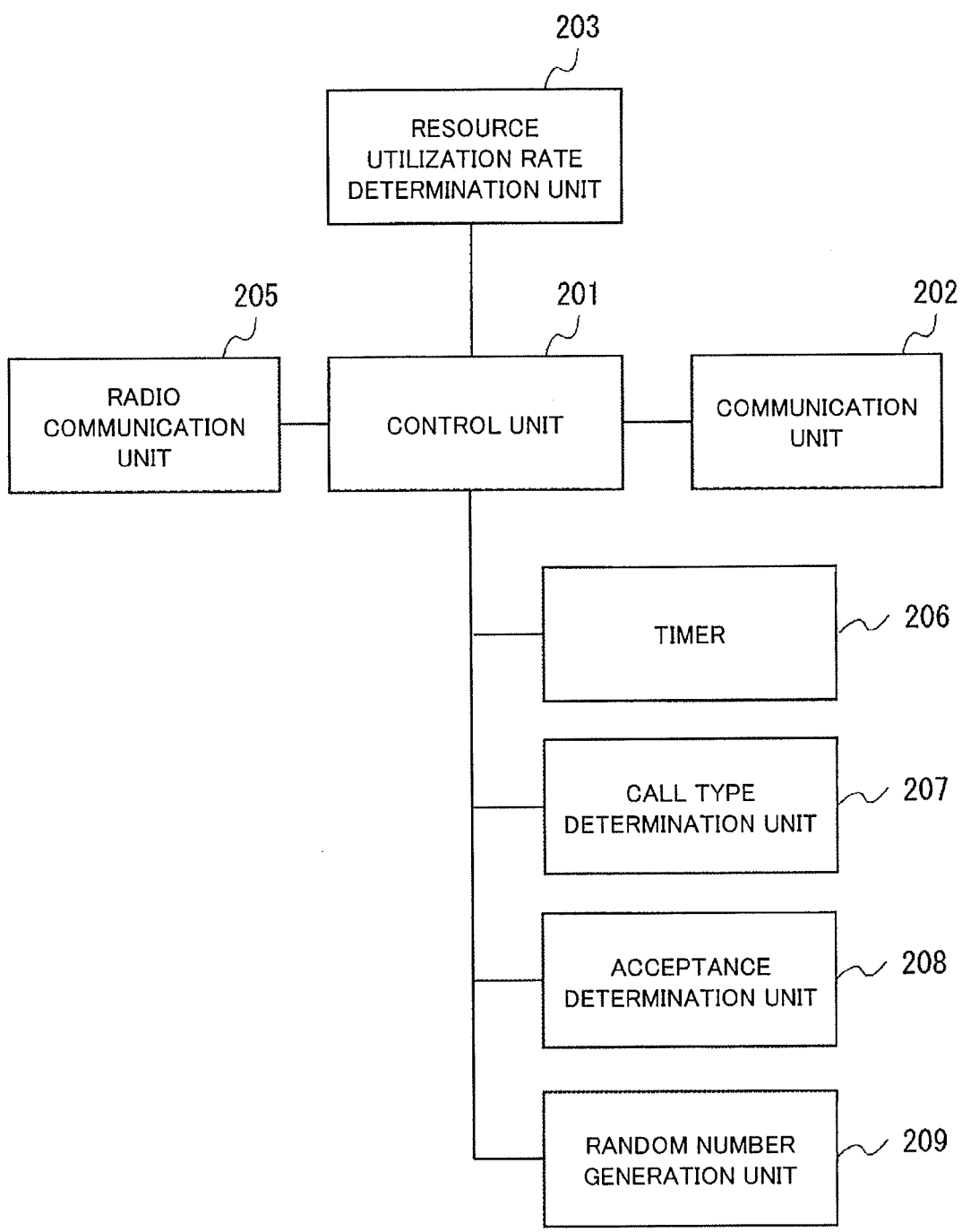
FIG. 5 is a diagram illustrating a configuration of a radio base station in FIG. 3.

The radio base station 2 is a device that performs radio communication with terminals 3 and has a role to relay user data between the terminals 3 and the core network 1 under the control of the core network 1, which is at the higher level. FIG. 5 is a diagram illustrating a configuration of the radio base station 2 in FIG. 3. By receiving an MME promotion start message 111 from the core network 1 by using a communication unit 202, the radio base station 2 determines that the core network 1 to which the radio base station 2 is connected is in the utilization promotion state.

Also, a resource utilization rate determination unit 203 of the radio base station 2 compares a resource utilization rate, which is obtained by measuring the number of users connected to the radio base station 2, the amount of data in processing, or the amount of information on a transmission path of radio resources, an S1 interface, and an X2 interface and comparing the measured value with an allowable value of the radio base station 2 itself, with a predetermined value. When the resource utilization rate is lower than the predetermined value, a control unit 201 of the radio base station 2 determines that the radio base station is in a state in which utilization is promotable.

In this case, the control unit 201 transmits an eNB promotion message(s) 131 to a terminal(s) 3 that reside(s) in the radio coverage of the radio base station 2 itself through the RRC interface 13 by using a radio communication unit 205. The eNB promotion message 131 is information that informs the terminal(s) 3 under the radio base station 2 of utilization promotion in which the terminal(s) 3 is/are encouraged to perform communication. The eNB promotion message 131 may be regularly notified to the terminal(s) 3 under the radio base station 2 simultaneously by using system information.

The radio base station 2 corresponds to the call processing control device 20 according to the first exemplary embodiment. The radio base station 2 includes a timer 206, a call type determination unit 207, an acceptance determination unit 208, and a random number generation unit 209. The call type determination unit 207 and the acceptance determination unit 208 correspond to the call type determination unit 21 and the acceptance determination unit 22 according to the first exemplary embodiment, respectively.

Figure 6:
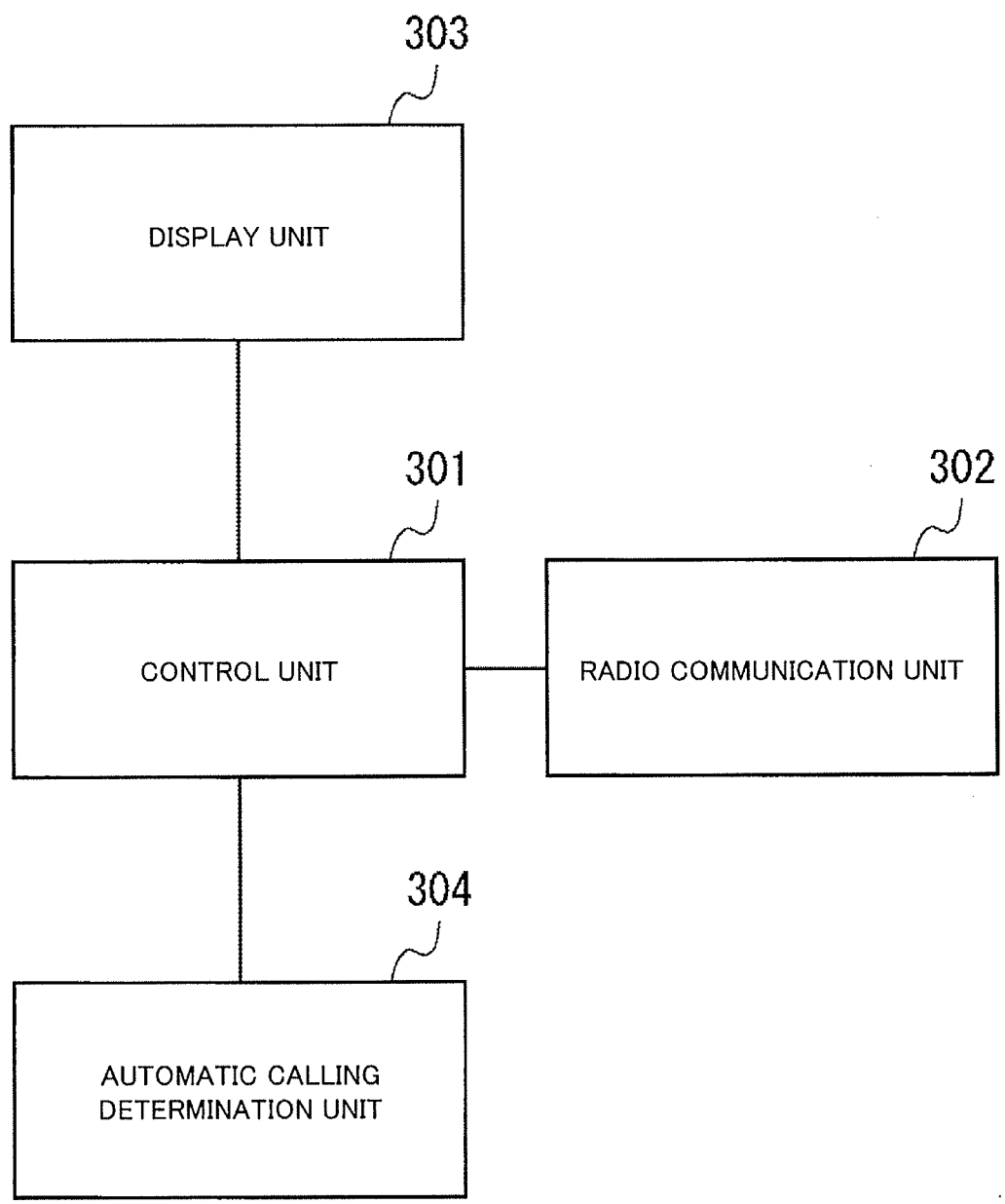
FIG. 6 is a diagram illustrating a configuration of a terminal in FIG. 3.

The terminal 3 is a radio device with which users transmit and receive voice calls and data. FIG. 6 is a diagram illustrating a configuration of the terminal 3 in FIG. 3. Through receiving an eNB promotion message 131 from a radio base station 2 by using a radio communication unit 302, the terminal 3 determines that the core network 1 and the radio base station 2 are in the utilization promotion state. Then, a control unit 301 of the terminal 3 displays a message encouraging a user to perform communication using his/her own terminal on a display unit 303 and starts communication as a promotion call in response to an operation by the user who has seen the displayed message. Alternatively, the control unit 301 starts transmission and reception of data as a promotion call automatically instead of by manual calling by the user. The automatic calling is performed by the control unit 301 in accordance with the result of determination performed by an automatic calling determination unit 304 of the terminal 3.

In the S1 interface 11 between each radio base station 2 and the core network 1, the MME promotion start message 111, which flows from the core network 1 toward the radio base station 2, is incorporated. The MME promotion start message 111 is a message notifying that the MME is in the utilization promotion state, and may include a core network identification ID, a message validity period, the QOS (Quality Of Service) type and data amount of a call to which utilization promotion is applicable, an MME promotion code (core network determination information), which is a unique value used to determine whether or not to accept a promotion call, or the like. In the S1 interface 11, an MME promotion stop message 112, which flows from the core network 1 toward each radio base station 2, is also incorporated. The MME promotion stop message 112 notifies that the MME has transited into a non-utilization promotion state.

In the RRC interface 13, the eNB promotion message 131, which flows from each radio base station 2 toward terminals 3, is incorporated. The eNB promotion message 131 is a message that is transmitted regularly when each eNB is in the utilization promotion state. The eNB promotion message 131 may include an eNB cell identification ID, a message validity period, the QOS type and data amount of a call to which utilization promotion is applicable, an eNB promotion code (radio base station determination information), which is a unique value used to determine whether or not to accept a promotion call, the MME promotion code received from the core network 1, or the like.

Further, through the RRC interface 13, each terminal 3 transmits an RRC connection request message 132 to a radio base station 2, and the radio base station 2 transmits an RRC connection setup message 133 or an RRC connection rejection message 134 to the terminal 3. The terminals 3 correspond to the terminals 30 according to the first exemplary embodiment. The RRC connection request message 132, RRC connection setup message 133, and RRC connection rejection message 134 correspond to the call connection request 32, connection setup message 33, and connection rejection message 34 according to the first exemplary embodiment, respectively.

Figure 7:
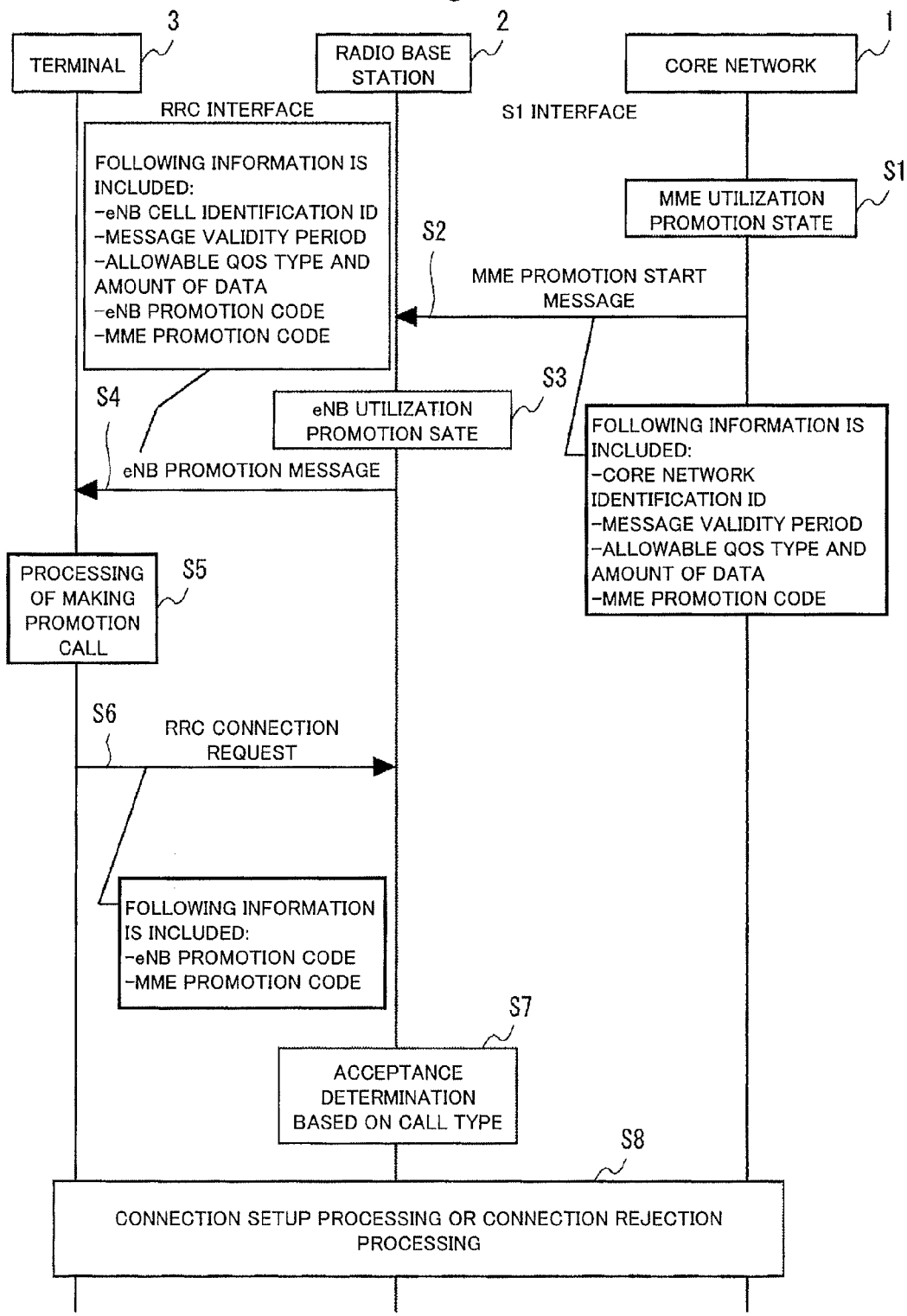
FIG. 7 is a sequence diagram illustrating an operation example of the mobile communication system in FIG. 3.

FIG. 7 is a sequence diagram illustrating an operation example in the mobile communication system illustrated in FIG. 3. In FIG. 7, when the core network 1 transits into an MME utilization promotion state (step S1), the core network 1 transmits, on the S1 interface, MME promotion start messages 111 to the radio base stations 2 (step S2). Each radio base station 2 that has received the MME promotion start message 111, by transiting into the eNB utilization promotion state (step S3), regularly transmits, on the RRC interface (step S4).

Each terminal 3 that has received the eNB promotion message 131, through a process of making a promotion call (step S5), transmits, on the RRC interface, an RRC connection request message 132 to the radio base station 2 (step S6). At this time, the terminal 3 transmits, to the radio base station 2, the eNB promotion code and the MME promotion code received through the eNB promotion message 131. The radio base station 2 that has received the eNB promotion code and the MME promotion code from the terminal 3 compares the codes with the eNB promotion code and the MME promotion code that the station itself has transmitted to the terminal 3 through the eNB promotion message 131 in step S4 to determine the call type of the RRC connection request message 132 (step S7).

When both codes coincide with each other, the radio base station 2 determines that the RRC connection request message 132 is a promotion call, and further performs acceptance determination to determine whether or not to accept a connection from the terminal 3 (step S7). When the radio base station 2 determines to accept a connection from the terminal 3 in the acceptance determination, or, the call type resulted from the determination is different from promotion call, the radio base station 2 performs connection setup processing in step S8. In the connection setup processing, the radio base station 2 makes a call connection request to the core network 1, and transmits an RRC connection setup message 133 to the terminal 3. When the RRC connection request message 132 is determined as a promotion call, the radio base station 2 makes a call connection request by including the call connection request together with the MME promotion code received from the terminal 3 into an Initial UE message or a NAS message on the S1 interface. The core network 1 that receives the call connection request including the MME promotion code compares the code with the MME promotion code included in the MME promotion start message 111 transmitted in step S2. When both codes coincide with each other, the core network 1 determines that the call connection request including the MME promotion code is a promotion call. In charging processing, the core network 1 applies a special price, such as discount charge and flat-rate charge, to communication based on the call connection request determined to be a promotion call.

When, in the acceptance determination in step S7, it is determined that a connection from the terminal 3 is not accepted, the radio base station 2 performs connection rejection processing in step S8. In the connection rejection processing, the radio base station 2 transmits an RRC connection rejection message 134 to the terminal 3.

Figure 8:
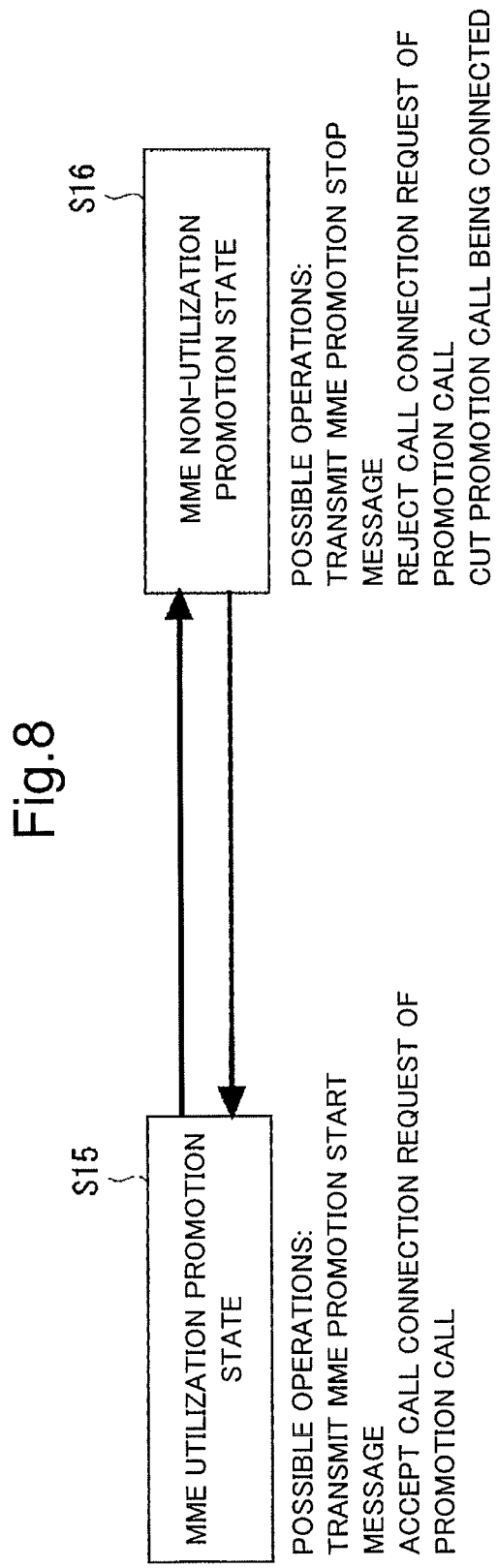
FIG. 8 is a state transition diagram of the core network in FIG. 3.

Next, an operation of the core network 1 in FIG. 3 will be described with reference to FIGS. 8 to 10. FIG. 8 is a state transition diagram of the core network 1 in FIG. 3. As illustrated in FIG. 8, the core network 1 has two states: an MME utilization promotion state S15, and an MME non-utilization promotion state S16. The core network 1 that is in the MME utilization promotion state S15 transmits, on the S1 interface, the MME promotion start messages 111 to the radio base stations 2, and, in receiving a call connection request of a promotion call from a radio base station 2, confirms correspondence between the MME promotion codes and performs promotion call reception. The core network 1 that is in the MME non-utilization promotion state S16 transmits the MME promotion stop messages 112 on the S1 interface, rejects a call connection request(s) of a promotion call(s) from the radio base stations 2, and cut a promotion call(s) that has/have been connected.

Figure 9:
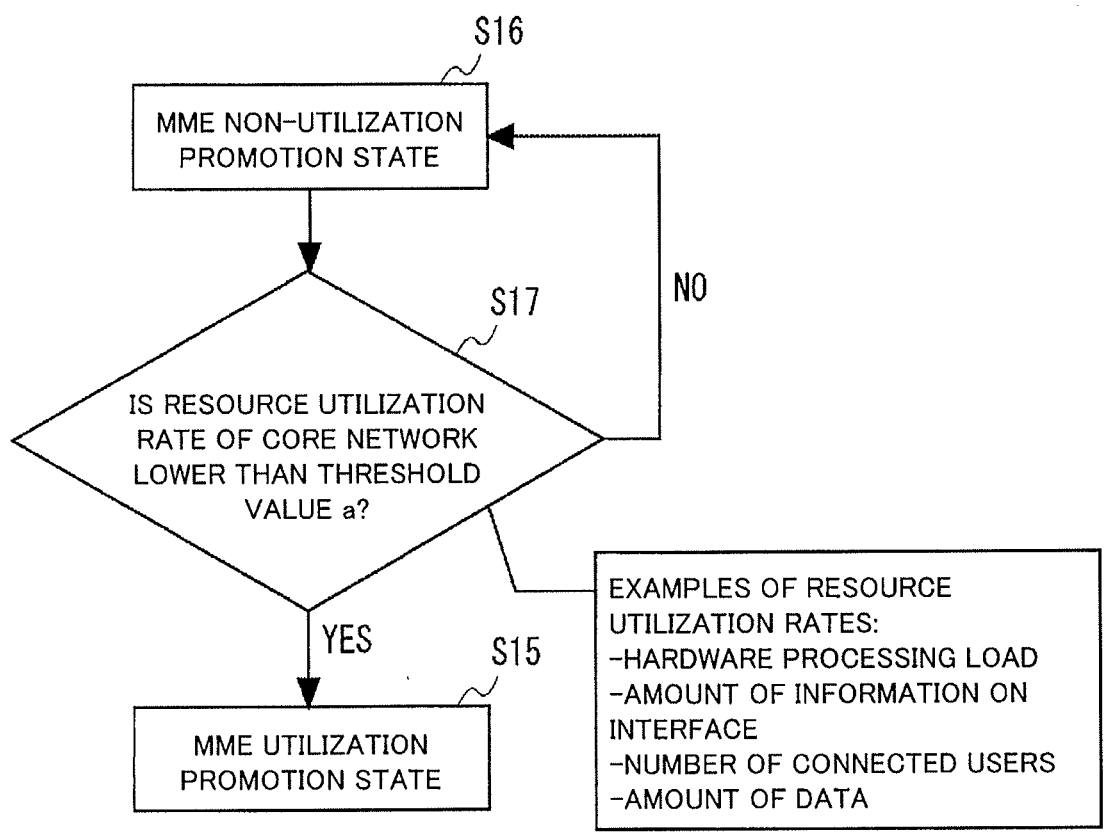
FIG. 9 is a determination flowchart for a transition of the core network in FIG. 3 to an MME utilization promotion state.

FIG. 9 is a determination flowchart for a transition of the core network 1 in FIG. 3 to the MME utilization promotion state S15. When the core network 1 that is in the MME non-utilization promotion state S16 determines that the resource utilization rate of the core network 1 is lower than a threshold value a (step S17), the core network 1 performs a state transition to the MME utilization promotion state S15. As used herein, the resource utilization rate is either one of the ratios of a hardware processing load on the MME or SGW, an amount of information on inter-hardware interfaces, the number of connected users, an amount of data, and the like to corresponding allowable amounts.

Figure 10:
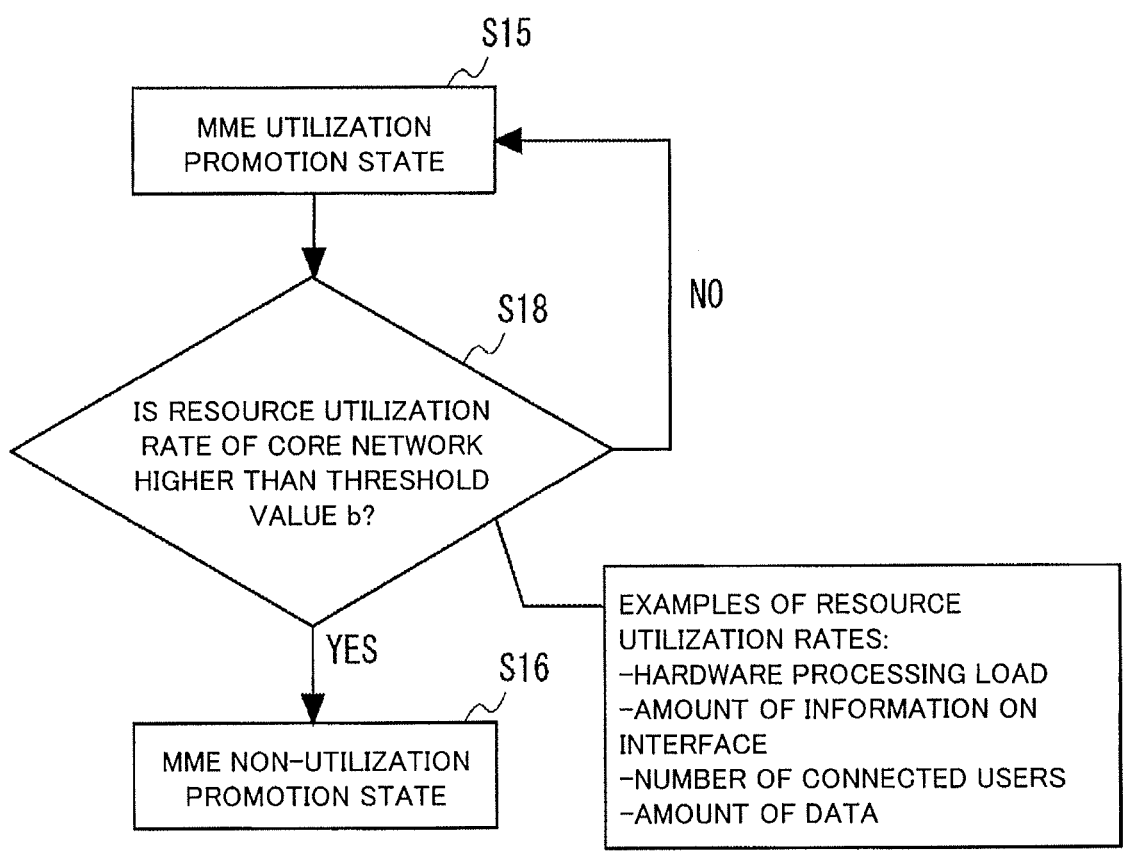
FIG. 10 is a determination flowchart for a transitions of the core network in FIG. 3 to an MME non-utilization promotion state.

FIG. 10 is a determination flowchart for a transition of the core network 1 in FIG. 3 to the MME non-utilization promotion state S16. When the core network 1 that is in the MME utilization promotion state S15 determines that the resource utilization rate of the core network 1 is higher than a threshold value b (step S18), the core network 1 performs a state transition to the MME non-utilization promotion state S16. As used herein, the resource utilization rate is either one of the ratios of a hardware processing load on the MME or SGW, an amount of information on inter-hardware interfaces, the number of connected users, an amount of data, and the like to corresponding allowable amounts.

Figure 11:
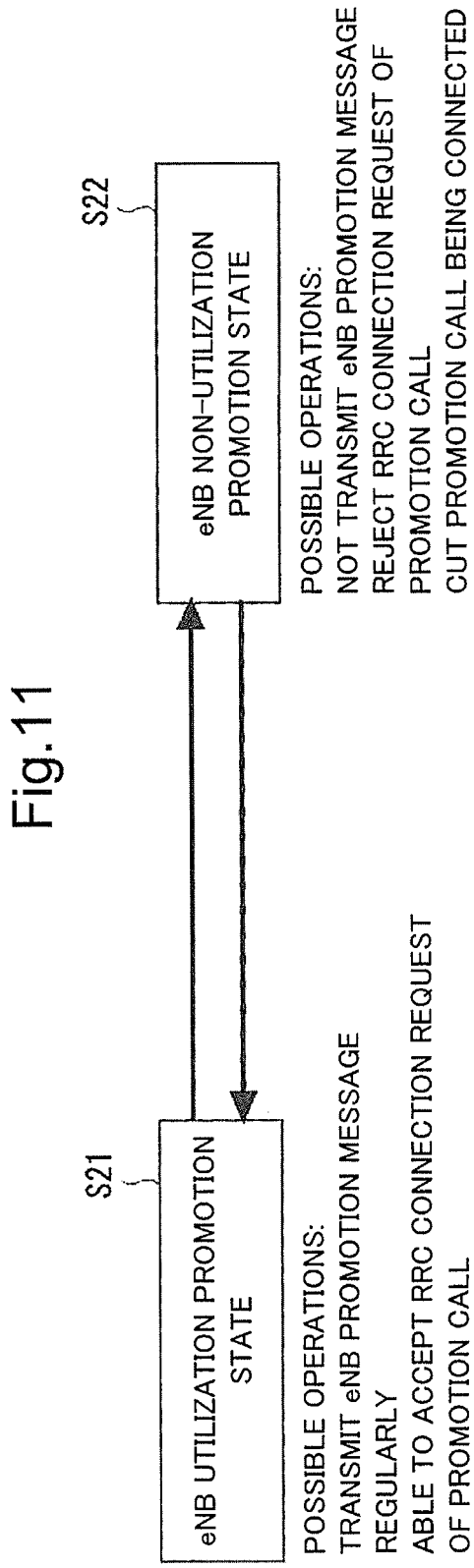
FIG. 11 is a state transition diagram of the radio base station in FIG. 3.

Next, an operation of the radio base station 2 in FIG. 3 will be described with reference to FIGS. 11 to 13. FIG. 11 is a state transition diagram of the radio base station 2 in FIG. 3. As illustrated in FIG. 11, the radio base station 2 has two states: an eNB utilization promotion state S21, and an eNB non-utilization promotion state S22. The radio base station 2 that is in the eNB utilization promotion state S21 regularly transmits, on the RRC interface, the eNB promotion messages 131 to terminals 3, and is able to accept an RRC connection request(s) 132 of a promotion call(s) from a terminal(s) 3. The radio base station 2 that is in the eNB non-utilization promotion state S22 stops transmitting the eNB promotion messages 131 on the RRC interface, rejects an RRC connection request(s) 132 of a promotion call(s) from the terminal(s) 3, and cut a promotion call(s) that has/have been connected.

Figure 12:
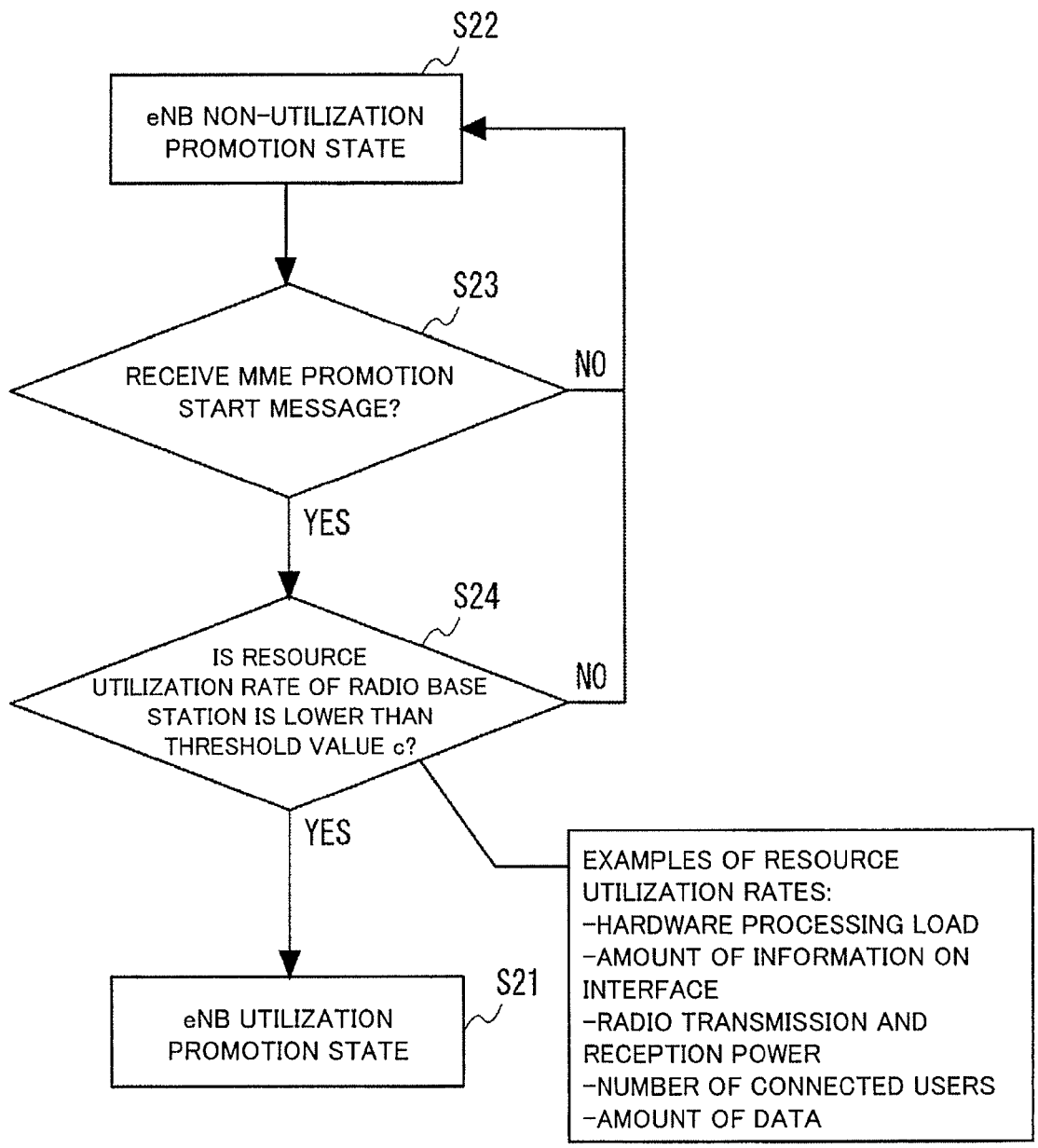
FIG. 12 is a determination flowchart for a transition of the radio base station in FIG. 3 to an eNB utilization promotion state.

FIG. 12 is a determination flowchart for a transition of the radio base station 2 in FIG. 3 to the eNB utilization promotion state S21. When the radio base station 2 that is in the eNB non-utilization promotion state S22 receives an MME promotion start message 111 from the core network 1 (step S23), the process proceeds to step S24. In step S24, when the radio base station 2 determines that the resource utilization rate of the radio base station 2 is lower than a threshold value c, the radio base station 2 performs a state transition to the eNB utilization promotion state S21. As used herein, the resource utilization rate is either one of the ratios of a hardware processing load on the radio base station 2, an amount of information on the S1 or X2 interface, radio transmission and reception power, the number of connected users, and an amount of data to corresponding allowable amounts.

Figure 13:
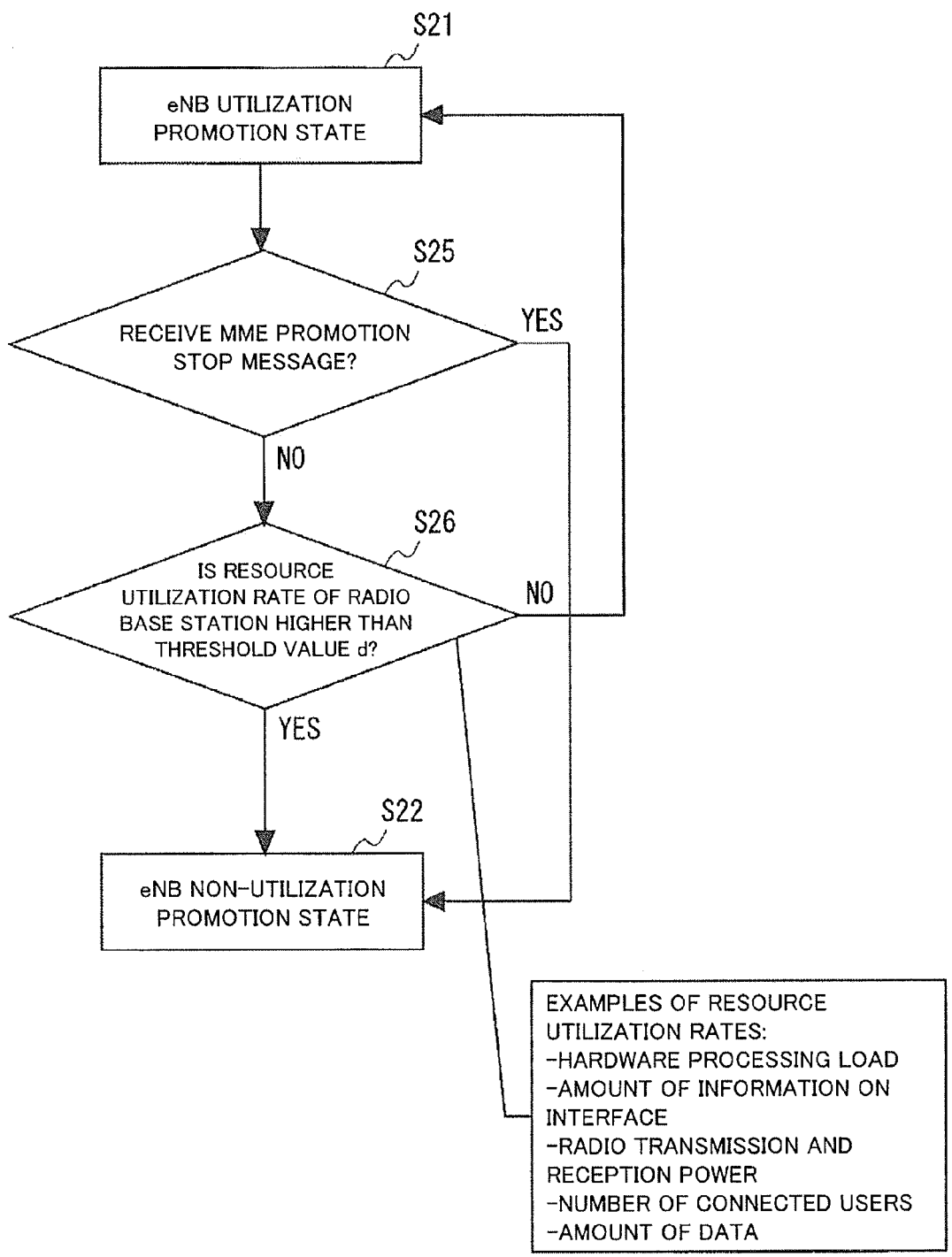
FIG. 13 is a determination flowchart for a transition of the radio base station in FIG. 3 to an eNB non-utilization promotion state.

FIG. 13 is a determination flowchart for a transition of the radio base station 2 in FIG. 3 to the eNB non-utilization promotion state S22. When the radio base station 2 that is in the eNB utilization promotion state S21 receives an MME promotion stop message 112 from the core network 1 (step S25), the radio base station 2 performs a state transition to the eNB non-utilization promotion state S22. Also, when the radio base station 2 determines that the resource utilization rate of the radio base station 2 is higher than a threshold value d even if the radio base station 2 has not received an MME promotion stop message 112 in step S25 (step S26), the radio base station 2 performs a state transition to the eNB non-utilization promotion state S22. As used herein, the resource utilization rate is either one of the ratios of a hardware processing load on the radio base station 2, an amount of information on the S1 or X2 interface, radio transmission and reception power, the number of connected users, and an amount of data to corresponding allowable amounts.

Figure 14:
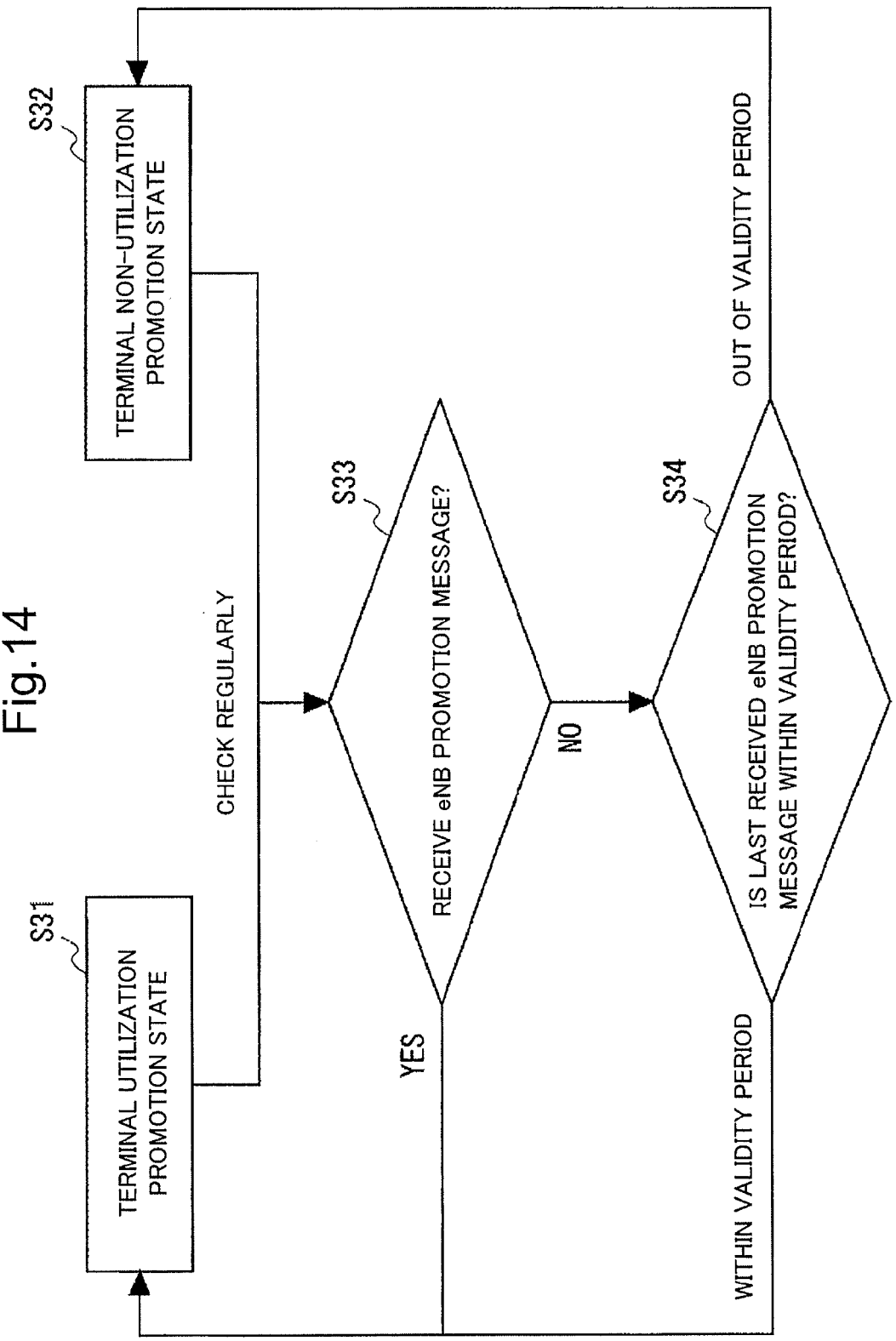
FIG. 14 is a determination flowchart for transitions of the terminal in FIG. 3 to a terminal utilization promotion state and a terminal non-utilization promotion state.

Next, an operation of the terminal 3 in FIG. 3 will be described with reference to FIGS. 14 to 16. FIG. 14 is a determination flowchart for a transition of the terminal 3 in FIG. 3 to a terminal utilization promotion state or a terminal non-utilization promotion state. As illustrated in FIG. 14, the terminal 3 has two states: a terminal utilization promotion state S31, and a terminal non-utilization promotion state S32. When the terminal 3 that is in either of the states confirms periodical reception of eNB promotion messages 131 on the RRC interface from the radio base station 2 (step S33), the terminal 3 transits into the terminal utilization promotion state S31.

Also, even if the terminal 3 does not receive an eNB promotion message 131, when it is determined that the current time is within a validity period indicated in the last eNB promotion message 131 received from the radio base station 2 (step S34), the terminal 3 continues the terminal utilization promotion state S31, and, when it is determined that the current time is out of the validity period (step S34), the terminal 3 transits into the terminal non-utilization promotion state S32. The terminal 3 that is in the terminal non-utilization promotion state S32 is unable to make a promotion call.

Figure 15:
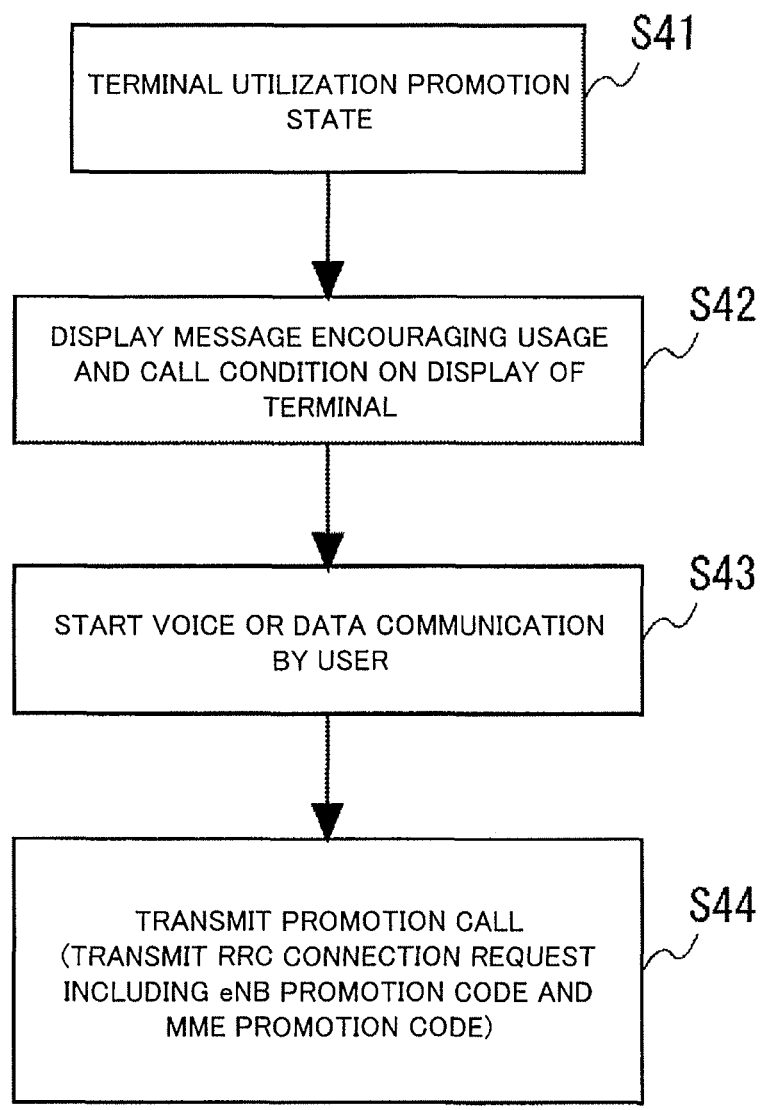
FIG. 15 is a flowchart in which a user makes a promotion call by using the terminal, which is in the terminal utilization promotion state, in FIG. 3.

FIG. 15 is a flowchart in which a user makes a promotion call by using the terminal 3 in FIG. 3, which is in the terminal utilization promotion state S31. The terminal 3 that has transited into the terminal utilization promotion state S31 (step S41) displays a message to promote usage (encouraging communication using the terminal 3) on the display unit 303 (step S42). For example, the displayed message is a message proposing a call condition that is advantageous for the user in terms of price or the like, such as "a discount of 20% off the call charge is currently applied" and "a flat-rate charge is currently applied until midnight". Displayed content may be created using information included in the eNB promotion message 131 notified by the radio base station 2.

When the user who has seen the displayed message carries out a transmission of voice or data communication (step S43), the terminal 3 transmits an RRC connection request 132 including the eNB promotion code and the MME promotion code to the radio base station 2 (step S44). Subsequently, when connection setup processing is performed (step S8), communication of the promotion call is started.

Figure 16:
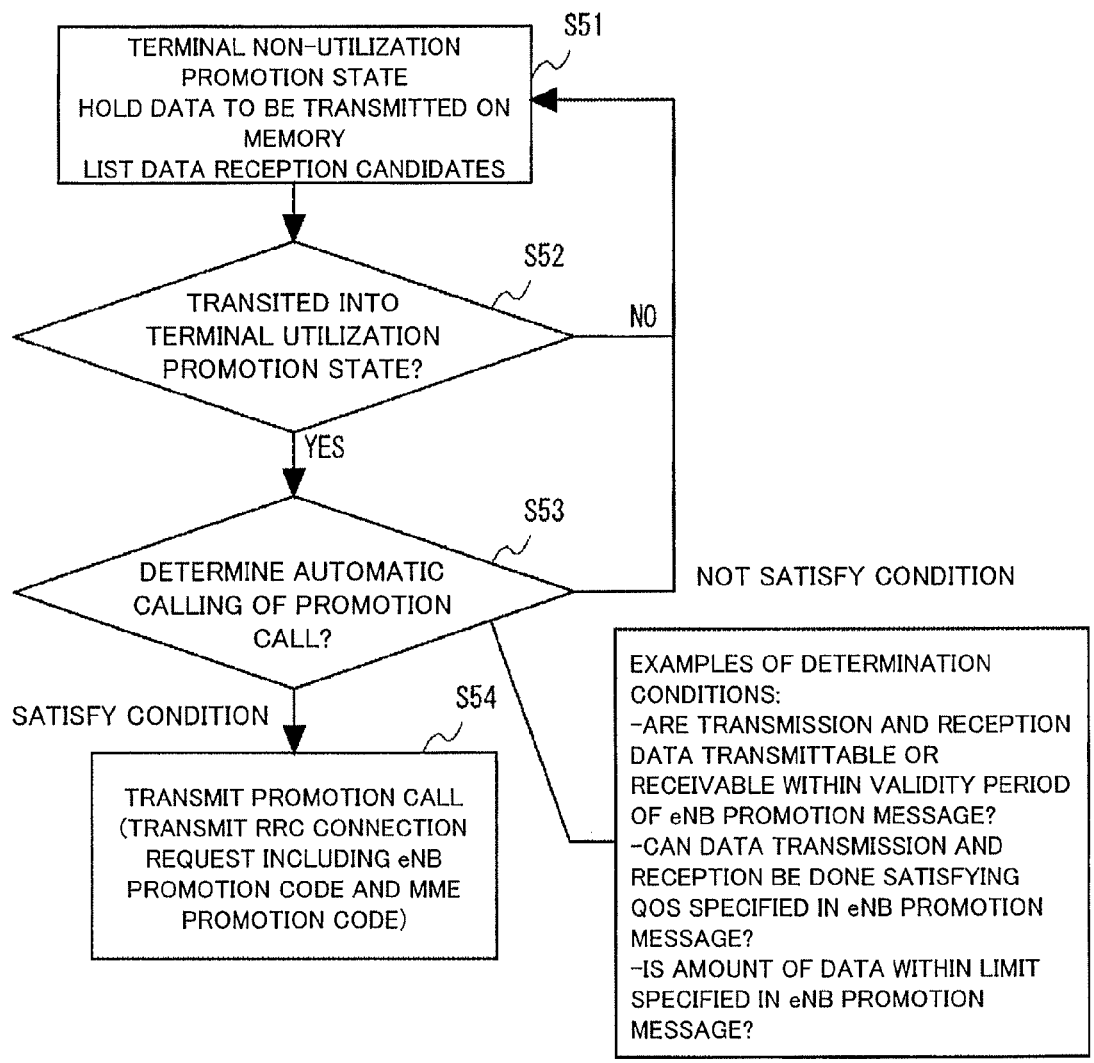
FIG. 16 is a flowchart in which the terminal, which has transited into the terminal utilization promotion state, in FIG. 3 automatically makes a promotion call.

FIG. 16 is a flowchart in which the terminal 3 in FIG. 3 that has transited into the terminal utilization promotion state S31 automatically makes a promotion call. The terminal 3 that is in the terminal non-utilization promotion state S32 holds data to be transmitted in a not-illustrated memory and also holds a list of candidate data to be received in the memory (step S51). When the terminal 3 transits into the terminal utilization promotion state S31 (step S52), the terminal 3 performs automatic calling determination of promotion call (step S53). Conditions in the determination are, based on conditions that have been transmitted from the radio base station 2 through an eNB promotion message 131 (a message validity period and an allowable QOS type and amount of data of a call), defined as whether or not data planned to be transmitted and received can be transmitted and received within the message validity period, whether or not transmission and reception of the data planned to be transmitted and received can be performed satisfying the specified QOS, whether or not the amount of data planned to be transmitted and received is within the specified limit, or the like.

When data satisfying the conditions exist in the automatic calling determination of promotion call, the terminal 3, to perform transmission to a predetermined transmission destination of the data or to perform reception from a predetermined reception source of the data, transmits an RRC connection request 132 including the eNB promotion code and the MME promotion code to the radio base station 2 (step S54). Subsequently, when the connection setup processing is performed (step S8), communication of the promotion call is started.

In FIG. 16, it is conceivable that data that do not need to be transmitted immediately (to be notified at once in real time) as data to be transmitted are transmitted when the terminal 3 transits into the terminal utilization promotion state S31. Examples of such data include: daily sales information collected by a vending machine including a terminal 3; electricity/gas usage information collected by various types of meter including a terminal 3; geographic information collected by a vehicle including a terminal 3; weather and environmental information collected by a sensor including a terminal 3; information on the radio wave environment, positions, and the terminal usage state by the user (traffic volume, service call type, communication quality, communication time, or the like) collected by a terminal 3; and emails, game scores/results, pictures, videos, music, documents, software, personal information, bulletin board messages, database, or the like reserved by the user of a terminal 3 for transmission.

In FIG. 16, it is also conceivable that data that do not need to be received immediately (to be known at once in real time) as candidate data to be received are listed in advance and received when the terminal 3 transits into the terminal utilization promotion state S31. After the terminal 3 receives such data, the user can use the data in an off-line manner. Examples of such data include: information on update software, middleware, database, or the like that is applied to a terminal 3 itself or a computer, a vending machine, machinery, or the like including the terminal 3; and emails, game software, pictures, videos, music, documents, books, software, news, bulletin board messages, TV schedules, weather information, map information, product price information, database, RSS feed information (used in news sites, blogs, or podcast distribution), or the like reserved by the user of a terminal 3 for reception.

Figure 17:
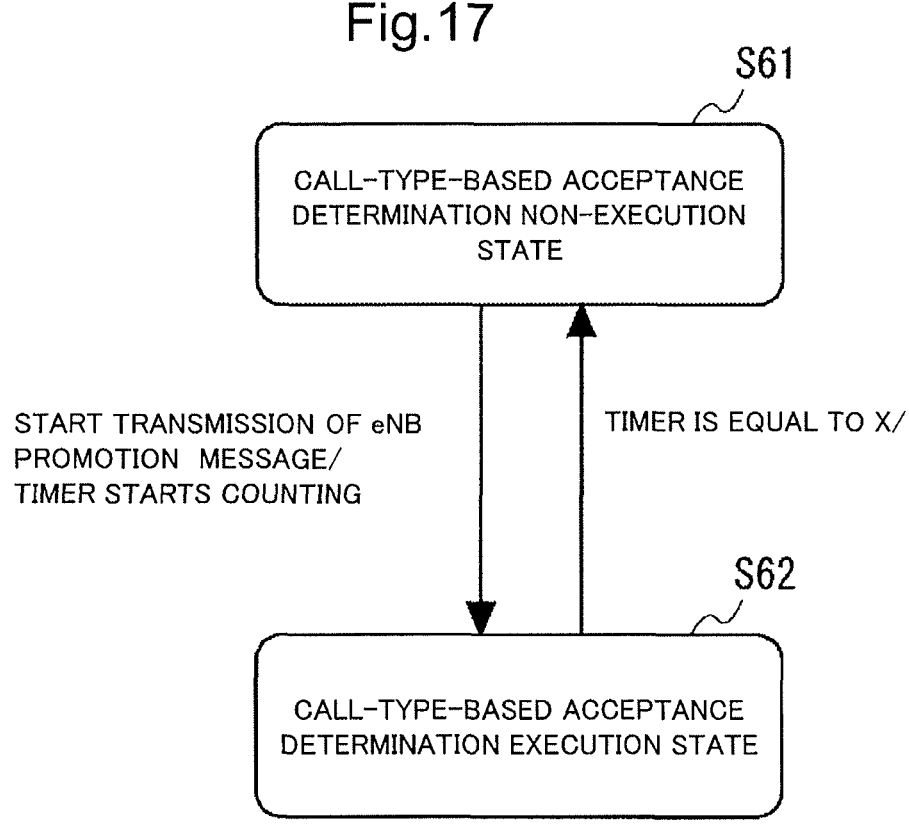
FIG. 17 is a state transition diagram of the radio base station in FIG. 3.

Next, an operation of the radio base station 2 in FIG. 3 will be described with reference to FIGS. 17 and 18. FIG. 17 is a state transition diagram of the radio base station 2 in FIG. 3. As illustrated in FIG. 17, the radio base station 2 has two states: a call-type-based acceptance determination non-execution state S61, and a call-type-based acceptance determination execution state S62. When the transmission of the eNB promotion messages 131 is started, the radio base station 2 transits from the call-type-based acceptance determination non-execution state S61 to the call-type-based acceptance determination execution state S62. At this time, the timer 206 starts counting. When the timer 206 has counted a predetermined time X (sec.), the radio base station 2 transits from the call-type-based acceptance determination execution state S62 to the call-type-based acceptance determination non-execution state S61.

When the radio base station 2 is in the call-type-based acceptance determination non-execution state S61, the call type determination unit 207 does not perform processing of determining the call type of an RRC connection request 132 and, based on the result of the call type determination, classifying the RRC connection request 132 as either a subject for acceptance determination or not a subject for acceptance determination. The acceptance determination unit 208 does not perform processing of determining whether or not to accept an RRC connection request 132 that is classified as a subject for acceptance determination.

When the radio base station 2 is in the call-type-based acceptance determination execution state S62, the call type determination unit 207 performs processing of determining the call type of an RRC connection request 132 and, based on the result of the call type determination, classifying the RRC connection request 132 as either a subject for acceptance determination or not a subject for acceptance determination. The acceptance determination unit 208 performs processing of determining whether or not to accept an RRC connection request 132 that is classified as a subject for acceptance determination.

Figure 18:
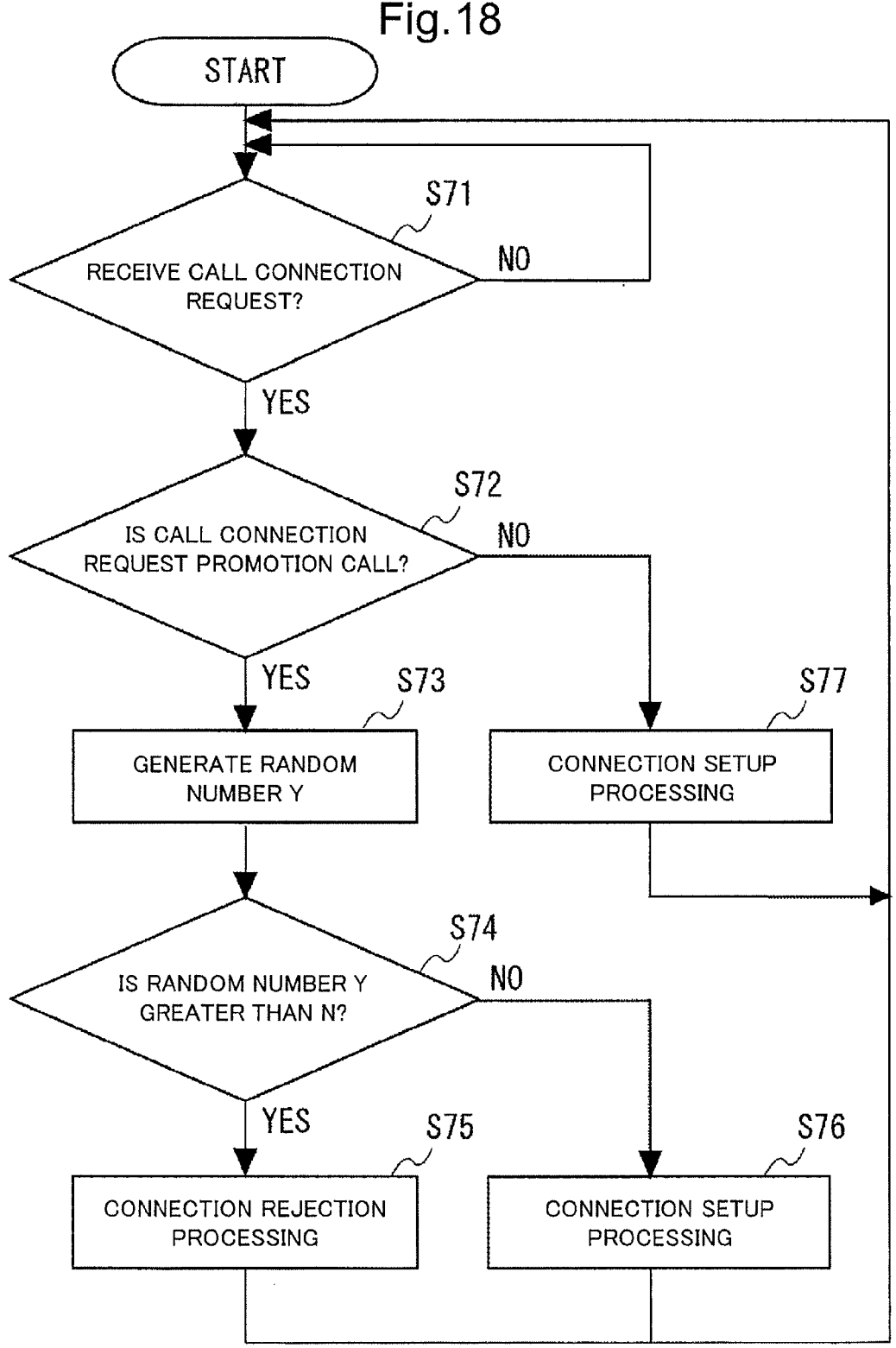
FIG. 18 is a flowchart illustrating a method for restricting reception of a call connection request(s) according to the second exemplary embodiment.

FIG. 18 is a flowchart illustrating a method for restricting reception of a call connection request(s) that the radio base station 2 that is in the call-type-based acceptance determination execution state S62 performs. Steps S71 to S74 correspond to step S7 in FIG. 7. Steps S75 to S77 correspond to step S8 in FIG. 7. When the radio base station 2 receives an RRC connection request 132 from a terminal 3 (step S71), the call type determination unit 207 determines whether or not the RRC connection request 132 is a promotion call (step S72), classifies the RRC connection request 132 that is determined as a promotion call as a subject for acceptance determination (YES in step S72), and classifies RRC connection request 132 that is not determined as a promotion call as not a subject for acceptance determination (NO in step S72).

When the radio base station 2 has received an MME promotion start message 111, the call type determination unit 207 determines, as a promotion call, an RRC connection request 132 transmitted by a terminal 3 that has received an eNB promotion message 131 transiting into the terminal utilization promotion state. The MME promotion start message 111 above is a message that is transmitted from the core network 1 that has transited into the MME utilization promotion state when the resource utilization rate of the core network 1 is lower than a predetermined threshold value and used to encourage the terminals 3 to perform communication. The eNB promotion message 131 above is a message that is transmitted from a radio base station 2 that has transited into the eNB utilization promotion state when the resource utilization rate of the radio base station 2 is lower than a predetermined threshold value and used to encourage terminals 3 to perform communication.

At this time, the call type determination unit 207 determines whether or not the RRC connection request 132 is a promotion call based on the MME promotion code (core network determination information) and the eNB promotion code (radio base station determination information) both of which are included in the RRC connection request 132. The call type determination unit 207 may perform the determination based on only the eNB promotion code (radio base station determination information).

When the RRC connection request 132 is determined to be a promotion call (YES in step S72), the random number generation unit 209 generates a random number Y (any number from 1 to 100) (step S73). The acceptance determination unit 208 determines whether or not the random number Y is larger than a predetermined value N (step S74). When the random number Y is larger than the value N (YES in step S74), the acceptance determination unit 208 determines not to accept the RRC connection request 132, and the radio base station 2 performs connection rejection processing (step S75). In the connection rejection processing, the control unit 201 makes the radio communication unit 205 transmit the RRC connection rejection message 134.

When the random number Y is not larger than the value N (NO in step S74), the acceptance determination unit 208 determines to accept the RRC connection request 132, and the radio base station 2 performs connection setup processing (step S76). In the connection setup processing, the control unit 201 makes the communication unit 202 transmit a call connection request to the core network 1 and the radio communication unit 205 transmit the RRC connection setup message 133. The call connection request above includes the MME promotion code (core network determination information) included in the RRC connection request 132.

When the RRC connection request 132 is not determined to be a promotion call (NO in step S72), the radio base station 2 performs the connection setup processing (step S77). In the connection setup processing, the control unit 201 makes the communication unit 202 transmit a call connection request to the core network 1 and the radio communication unit 205 transmit the RRC connection setup message 133.

According to the exemplary embodiment, since an RRC connection request 132 that is determined to be a promotion call is supposed to have a low priority, the RRC connection request 132 is determined to be accepted and becomes a subject for connection setup processing with a predetermined probability (N %), which is higher than 0% and lower than 100%. On the other hand, an RRC connection request 132 that is not determined to be a promotion call becomes a subject for the connection setup processing with a probability of 100%.

Furthermore, according to the exemplary embodiment, when the transmission of eNB promotion messages 131 is started, the call type determination unit 207 starts processing of determining the call type(s) of an RRC connection request(s) 132 and, based on the result(s) of the determination, classifying the RRC connection request(s) 132 as either a subject(s) for acceptance determination or not a subject(s) for acceptance determination, and the acceptance determination unit 208 starts processing of determining whether or not to accept an RRC connection request(s) 132 that is/are classified as a subject(s) for acceptance determination. When a predetermined time X has passed since the start of the transmission of eNB promotion messages 131, the call type determination unit 207 stops the processing of determining the call type(s) of an RRC connection request(s) 132 and, based on the result(s) of the determination, classifying the RRC connection request(s) 132 as either a subject(s) for acceptance determination or not a subject(s) for acceptance determination, and the acceptance determination unit 208 stops the processing of determining whether or not to accept an RRC connection request(s) 132 that is/are classified as a subject(s) for acceptance determination.

Accordingly, with the exemplary embodiment, the acceptance of promotion calls is restricted during only a certain period (a period of X seconds) since the start of the transmission of eNB promotion messages 131. Since the acceptance of promotion calls is restricted during only a period for which there is a high probability that a lot of promotion calls take place simultaneously, the acceptance of promotion calls being unnecessarily restricted is prevented.

The values N and X may be set to the radio base stations 2 in advance, or notified from the core network 1 to the radio base stations 2.

Third Exemplary Embodiment

Next, a mobile communication system according to a third exemplary embodiment will be described. In the mobile communication system according to the third exemplary embodiment, the following points are changed from the mobile communication system according to the second exemplary embodiment. In the following description, descriptions of features that are common with the second exemplary embodiment and features that are obvious from the second exemplary embodiment will be omitted.

Figure 19:
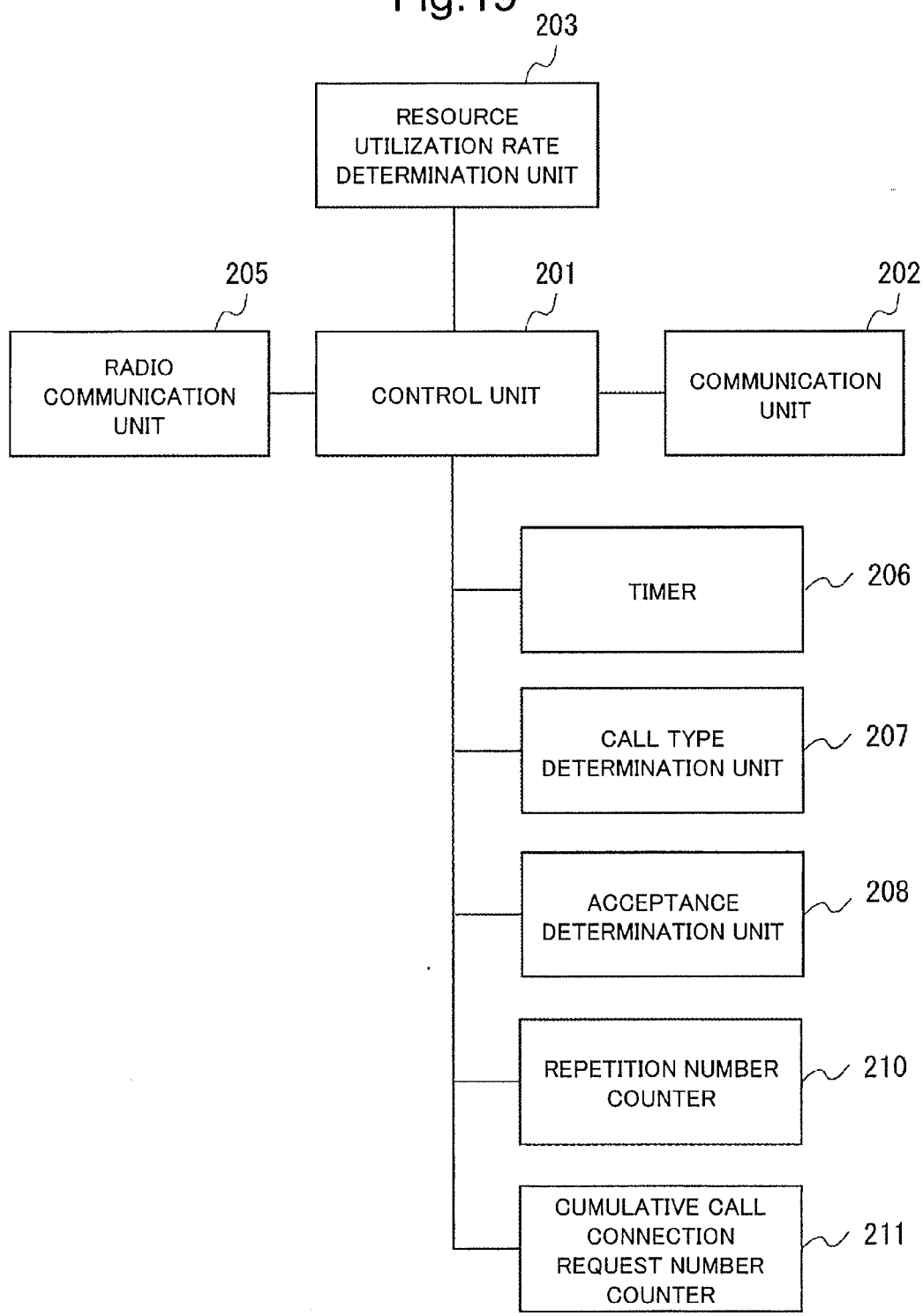
FIG. 19 is a diagram illustrating a configuration of a radio base station according to a third exemplary embodiment.

With reference to FIG. 19, a configuration of a radio base station 2 according to the third exemplary embodiment will be described. The radio base station 2 according to the third exemplary embodiment, as with the radio base station 2 according to the second exemplary embodiment, includes a control unit 201, a communication unit 202, a resource utilization rate determination unit 203, a radio communication unit 205, a timer 206, a call type determination unit 207, and an acceptance determination unit 208. The radio base station 2 according to the third exemplary embodiment further includes a repetition number counter 210 and a cumulative call connection request number counter 211.

Figure 20:
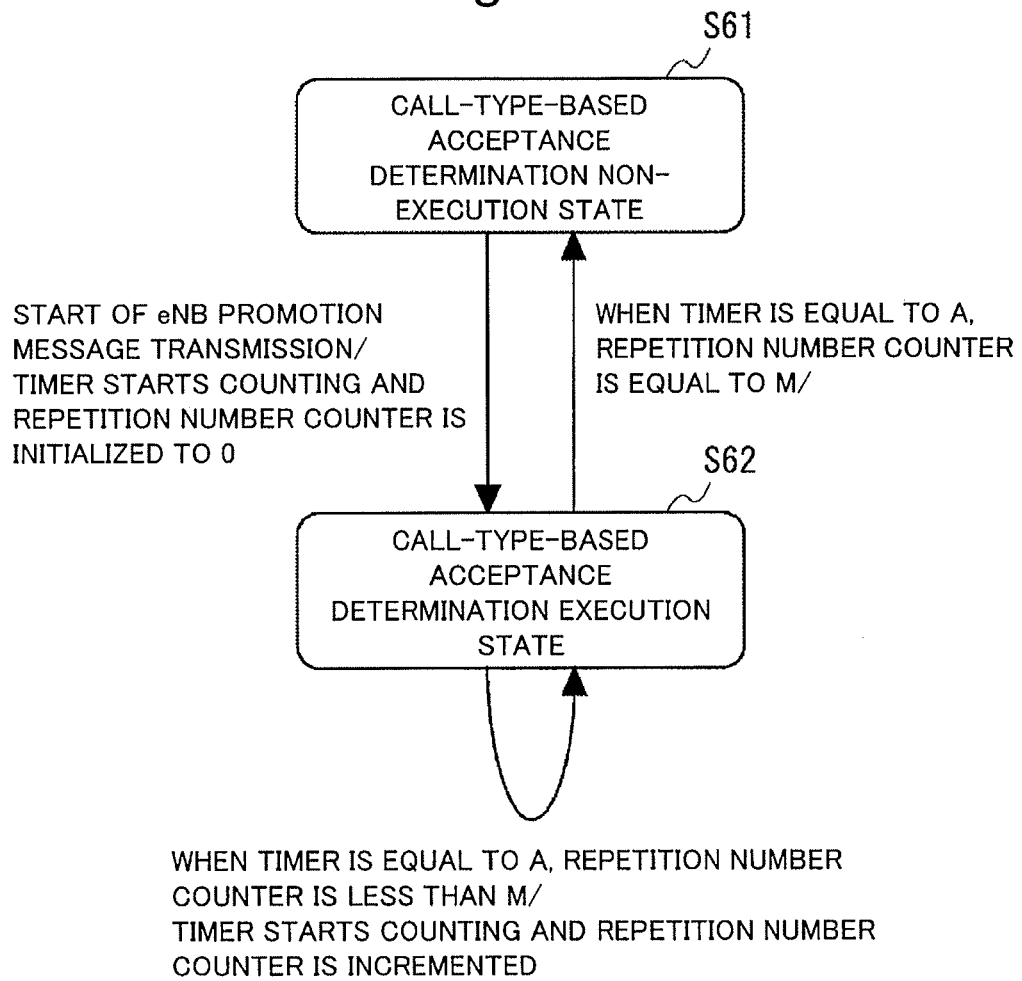
FIG. 20 is a state transition diagram of the radio base station according to the third exemplary embodiment.

Next, an operation of the radio base station 2 according to the third exemplary embodiment will be described with reference to FIGS. 20 and 21. FIG. 20 is a state transition diagram of the radio base station 2. As illustrated in FIG. 20, the radio base station 2 has two states: a call-type-based acceptance determination non-execution state S61, and a call-type-based acceptance determination execution state S62. When the transmission of eNB promotion messages 131 is started, the radio base station 2 transits from the call-type-based acceptance determination non-execution state S61 to the call-type-based acceptance determination execution state S62. At this time, the timer 206 starts counting from an initial value, and the repetition number counter 210 is reset to 0.

When the timer 206 has counted a predetermined time A (sec.) and the value of the repetition number counter 210 is less than a predetermined number of repetitions M, the radio base station 2 transit is from the call-type-based acceptance determination execution state S62 to the call-type-based acceptance determination execution state S62. At this time, the timer 206 starts counting from the initial value, and the repetition number counter 210 is incremented. When the timer 206 has counted the predetermined time A and the value of the repetition number counter 210 is equal to the predetermined number of repetitions M, the radio base station 2 transits from the call-type-based acceptance determination execution state S62 to the call-type-based acceptance determination non-execution state S61.

Figure 21:
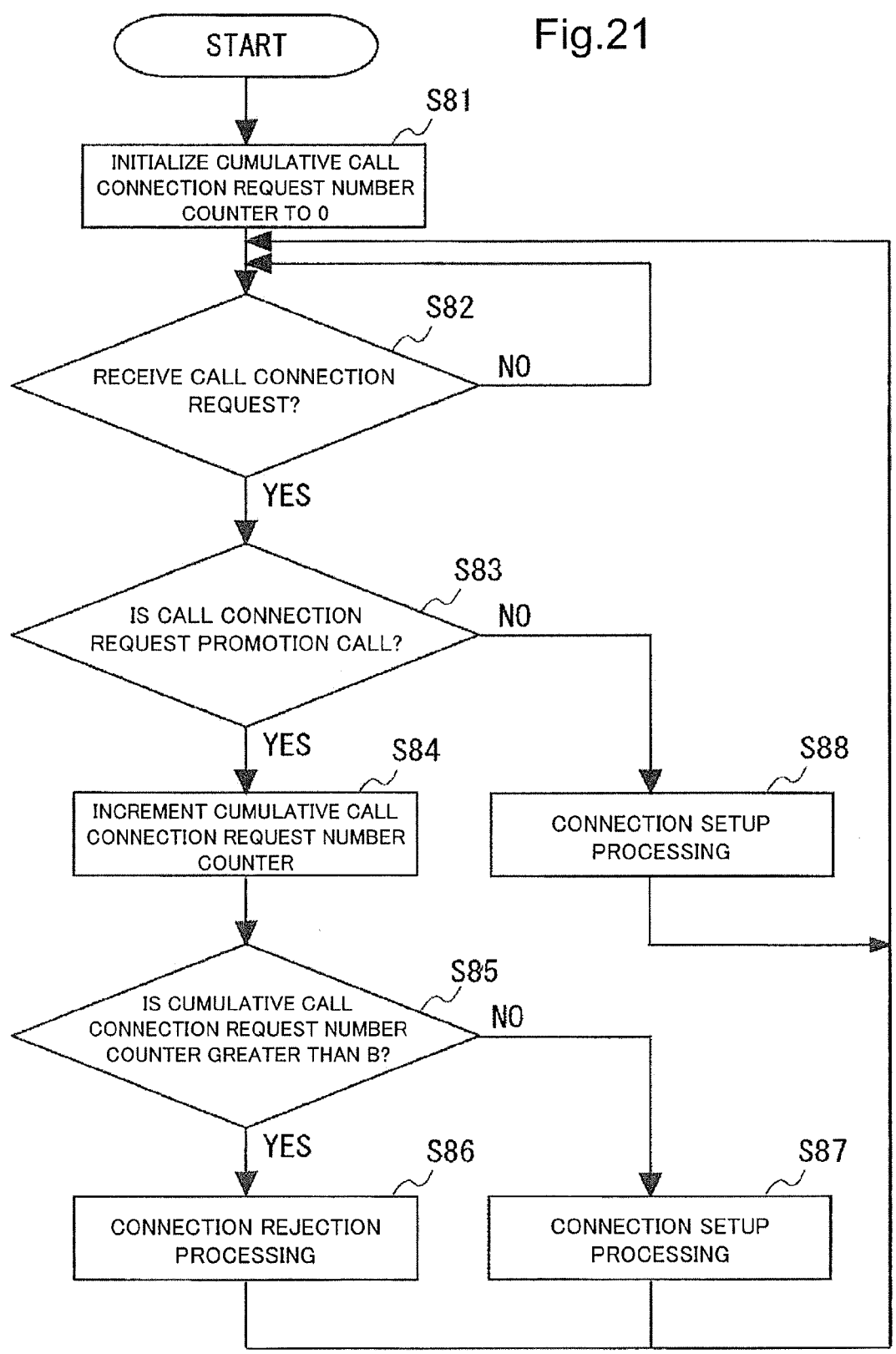
FIG. 21 is a flowchart illustrating a method for restricting reception of a call connection request(s) according to the third exemplary embodiment.

FIG. 21 is a flowchart illustrating a method for restricting reception of a call connection request(s) that the radio base station 2 that is in the call-type-based acceptance determination execution state S62 performs. Steps S81 to S85 correspond to step S7 in FIG. 7. Steps S86 to S88 correspond to step S8 in FIG. 7. When the radio base station 2 transits into the call-type-based acceptance determination execution state S62, the cumulative call connection request number counter 211 is reset to 0 (step S81). When the radio base station 2 receives an RRC connection request 132 from a terminal 3 (step S82), the call type determination unit 207 determines whether or not the RRC connection request 132 is a promotion call (step S83), classifies the RRC connection request 132 that is determined as a promotion call as a subject for acceptance determination (YES in step S83), and classifies the RRC connection request 132 that is not determined as a promotion call as not a subject for acceptance determination (NO in step S83). Step S83 is the same as step S72.

When the RRC connection request 132 is determined to be a promotion call (YES in step S83), the cumulative call connection request number counter 211 is incremented (step S84). The acceptance determination unit 208 determines whether or not the value of the cumulative call connection request number counter 211 is greater than a prescribed value B (step S85). The prescribed value B is a natural number. When the value of the cumulative call connection request number counter 211 is greater than the prescribed value B (YES in step S85), the acceptance determination unit 208 determines not to accept the RRC connection request 132, and the radio base station 2 performs connection rejection processing (step S86). The connection rejection processing in step S86 is the same as the connection rejection processing in step S75.

When the value of the cumulative call connection request number counter 211 is not greater than the prescribed value B (NO in step S85), the acceptance determination unit 208 determines to accept the RRC connection request 132, and the radio base station 2 performs connection setup processing (step S87). The connection setup processing in step S87 is the same as the connection setup processing in step S76. When the RRC connection request 132 is not determined to be a promotion call (NO in step S83), the radio base station 2 performs the connection setup processing (step S88). The connection setup processing in step S88 is the same as the connection setup processing in step S77.

Figure 22:
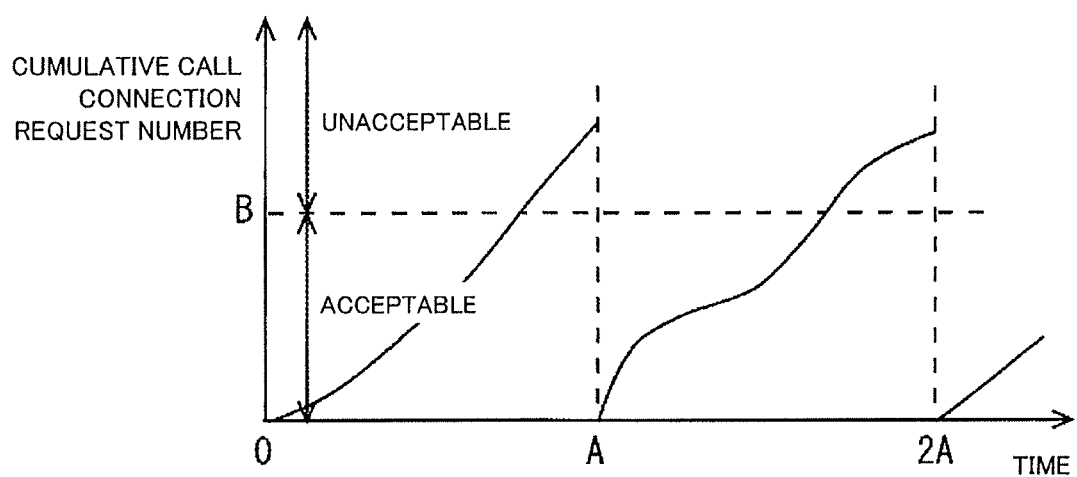
FIG. 22 is a conceptual diagram illustrating the method for restricting reception of a call connection request(s) according to the third exemplary embodiment.

FIG. 22 is a conceptual diagram illustrating the method for restricting reception of a call connection request(s) according to the third exemplary embodiment. The horizontal axis represents elapsed time since the point when the transmission of eNB promotion messages 131 was started. The vertical axis represents the cumulative number of RRC connection requests 132 that have been determined to be promotion calls, that is, the value of the cumulative call connection request number counter 211.

According to the exemplary embodiment, the acceptance determination unit 208 repeats, M times, processing of accepting a predetermined number B of RRC connection requests 132 among the RRC connection requests 132 that are classified as subjects for acceptance determination in arrival order and not accepting a subsequent RRC connection request(s) 132 during a period of A second(s). Thus, with the exemplary embodiment, the reception of promotion calls is restricted during only a certain period (a period of M×A second(s)) since the start of the transmission of eNB promotion messages 131.

The values A, B, and M may be set to the radio base stations 2 in advance or notified from the core network 1 to the radio base stations 2.

Fourth Exemplary Embodiment

Next, a mobile communication system according to a fourth exemplary embodiment will be described. The mobile communication system according to the fourth exemplary embodiment is a mobile communication system on which functions of the mobile communication system according to the second or third exemplary embodiment are achieved using a mobile communication system based on WCDMA (Wideband Code Division Multiple Access) (Registered Trademark). In the following description, descriptions of features that are common with the second and third exemplary embodiments and features that are obvious from the second and third exemplary embodiments will be omitted.

With reference to FIG. 23, the mobile communication system according to the fourth exemplary embodiment will be described. The mobile communication system according to the fourth exemplary embodiment include a plurality of terminals 503, each of which is a portable radio device that a user uses and is referred to as a UE (User Equipment) in WCDMA, radio base stations 502B, each of which performs radio communication with terminals 503 and is referred to as a NodeB in WCDMA, radio network control stations 502A, each of which controls a radio base station 502B, and a core network 501, which is a higher-level network of these components. There is a case in which the radio network control station 502A is referred to as an RNC. Also, these nodes are interconnected through interfaces. The terminal 503, the radio network control station 502A, and the core network 501 correspond to the terminal 3, the radio base station 2, and the core network 1, respectively.

The core network 501 transmits promotion start messages 611 and promotion stop messages 612 to the radio network control stations 502A. The promotion start message 611 and the promotion stop message 612 correspond to the MME promotion start message 111 and the MME promotion stop message 112, respectively.

Each radio network control station 502A transmits promotion messages 631, connection setup messages 633, and connection rejection messages 634 to terminals 503 via a radio base station 502B. Each terminal 503 transmits a connection request message 632 to a radio network control station 502A via a radio base station 502B. The promotion message 631, the connection request message 632, the connection setup message 633, and the connection rejection message 634 correspond to the eNB promotion message 131, the RRC connection request message 132, the RRC connection setup message 133, and the RRC connection rejection message 134, respectively.

When the resource utilization rate of the core network 501 is lower than a predetermined threshold value, the core network 501 transits into a core network utilization promotion state and transmits promotion start messages 611 for encouraging the terminals 503 to perform communication to the radio network control stations 502A, including core network determination information into the promotion start messages 611.

When each radio network control station 502A receives a promotion start message 611 and the resource utilization rate of the radio base station 502B under the radio network control station 502A is lower than a predetermined threshold value at the time, the radio network control station 502A transits into a radio base station utilization promotion state. The radio network control station 502A that has transited into the radio base station utilization promotion state transmits promotion messages 631 for encouraging terminals 503 to perform communication to the terminals 503 via the radio base station 502B, including the core network determination information and radio base station determination information into the promotion messages 631.

When each terminal 503 receives a promotion message 631, the terminal 503 transits into a terminal utilization promotion state and transmits a connection request message 632 to a radio network control station 502A via a radio base station 502B, including the core network determination information and the radio base station determination information into the connection request message 632.

The radio network control station 502A, based on the core network determination information and the radio base station determination information, both of which are included in the connection request message 632, determines the connection request message 632 to be a promotion call, and classifies the connection request message 632 as a subject for acceptance determination. When the radio network control station 502A determines to accept the connection request message 632, the radio network control station 502A transmits a connection setup message 633 to the terminal 503 via the radio base station 502B. When the radio network control station 502A determines not to accept the connection request message 632, the radio network control station 502A transmits a connection rejection message 634 to the terminal 503 via the radio base station 502B.

It should be noted that the present invention is not limited to the above exemplary embodiments and can be changed appropriately without departing from the spirit and scope of the present invention. For example, both a promotion call(s) and a usual call(s) may be classified as a subject(s) for acceptance determination. Alternatively, an emergency call(s) may be classified as not a subject(s) for acceptance determination, and (an)other type(s) of call(s) may be classified as a subject(s) for acceptance determination. Furthermore, the method for restricting reception of a call connection request(s) may be achieved by a computer executing a program.

In the above-described examples, programs can be stored by using various types of non-transitory computer readable media and supplied to computers. The non-transitory computer readable media include various types of tangible storage media. Examples of the non-transitory computer readable media include a magnetic recording medium (for example, a flexible disk, a magnetic tape, and a hard disk drive), a magneto optical recording medium (for example, a magneto optical disk), a CD-ROM (Read Only Memory), a CD-R (Compact Disk-Recordable), a CD-R/W (Compact Disk-ReWritable), and a semiconductor memory (for example, a mask ROM, a PROM (Programmable ROM), an EPROM (Erasable PROM), a flash ROM, a RAM (Random Access Memory)). The programs may be supplied to the computers through various types of transitory computer readable media. Examples of the transitory computer readable media include electrical signals, optical signals, and electromagnetic waves. The transitory computer readable media are capable of supplying the programs to the computers via a wired communication path, such as electric wires, optical fibers, and the like, or a radio communication path.

While the invention has been particularly shown and described with reference to exemplary embodiments thereof, the invention is not limited to those embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2013-173225, filed on Aug. 23, 2013, the disclosure of which is incorporated herein in its entirety by reference

REFERENCE SIGNS LIST

1 Core network
2 Radio base station
3 Terminal
20 Call processing control device
21 Call type determination unit
22 Acceptance determination unit
30 Terminal
32 Call connection request
111 MME promotion start message
131 eNB promotion message
132 RRC connection request message
207 Call type determination unit
208 Acceptance determination unit
501 Core network
502A Radio network control station
502B Radio base station
503 Terminal
611 Promotion start message
632 Connection request message

The invention claimed is:

1. A radio base station comprising:
a transceiver configured to accept a call connection request; and
a controller configured to:
perform a first processing to determine a call type of the call connection request and, based on a determination result, classify the call connection request as either a subject for acceptance determination or not a subject for acceptance determination, and
perform a second processing to determine whether or not to accept the call connection request that is classified as a subject for acceptance determination in a manner in which a random number is assigned to the call connection request which is determined as of a promotion call, and the call connection request is accepted if the random number is larger than a threshold or if the call connection request is determined as not of a promotion call.

2. The radio base station according to claim 1,
wherein the transceiver receives the call connection request from a mobile terminal including information that indicates that the mobile terminal is in a promotion state.

3. The radio base station according to claim 2,
wherein, when the transmitter starts to transmit a radio base station utilization promotion message, the controller starts the first processing and the second processing, and
when a predetermined time has passed since the transmission of the radio base station utilization promotion message was started, the controller stops the first processing and the second processing.

4. The radio base station according to claim 2,
wherein the transceiver receives a core network utilization promotion message including core network determination information, and
transmits a radio base station utilization promotion message including the core network determination information and radio base station determination information,
and
the controller, based on the core network determination information and the radio base station determination information included in the call connection request transmitted by that the terminal, classifies the call connection request transmitted by that the terminal as a subject for acceptance determination.

5. A radio base station comprising:
a transceiver configured to accept a call connection request; and
a controller configured to:
perform a first processing to determine a call type of the call connection request and, based on a determination result, classify the call connection request as either a subject for acceptance determination or not a subject for acceptance determination, and
perform a second processing to determine whether or not to accept the call connection request that is classified as a subject for acceptance determination,
wherein the controller, in the second processing, repeats processing of determining to accept a number of call connection requests among call connection requests of promotion calls that are classified as subjects for acceptance determination in arrival order during a length of period.

6. A method comprising:
receiving a call connection request;
determining a call type of a call connection request from a mobile terminal;
based on a result of determining a call type, classifying the call connection request as either a subject for acceptance determination or not a subject for acceptance determination; and
determining whether or not to accept a call connection request that is classified as a subject for acceptance determination in a manner in which a random number is assigned to the call connection request which is determined as of a promotion call, and the call connection request is accepted if the random number is larger than a threshold or if the call connection request is determined as not of a promotion call.

7. A mobile terminal, comprising:
a transmitter configured to transmit a call connection request to a radio base station that determines a call type of the call connection request and, based on a determination result, classify the call connection request as either a subject for acceptance determination or not a subject for acceptance determination; and
determine whether or not to accept the call connection request that is classified as a subject for acceptance determination in a manner in which a random number is assigned to the call connection request which is determined as of a promotion call, and the call connection request is accepted if the random number is larger than a threshold or if the call connection request is determined as not of a promotion call.

8. The mobile terminal according to claim 7,
wherein the transmitter transmits the call connection request after receiving a radio base station utilization promotion message for encouraging the mobile terminals to perform communication from the radio base station.

\* \* \* \* \*